(12) United States Patent
Leimbach et al.

(10) Patent No.: US 10,486,776 B2
(45) Date of Patent: Nov. 26, 2019

(54) AMPHIBIOUS DEPLOYMENT SYSTEM AND METHOD

(71) Applicants: Wendell B. Leimbach, Saint Leonard, MD (US); Grant C. Pecoraro, Lafayette, LA (US)

(72) Inventors: Wendell B. Leimbach, Saint Leonard, MD (US); Grant C. Pecoraro, Lafayette, LA (US)

(*) Notice: Subject to any disclaimer, the term of this patent is extended or adjusted under 35 U.S.C. 154(b) by 0 days.

(21) Appl. No.: 15/869,843

(22) Filed: Jan. 12, 2018

(65) Prior Publication Data
US 2018/0327058 A1 Nov. 15, 2018

Related U.S. Application Data

(60) Provisional application No. 62/445,974, filed on Jan. 13, 2017, provisional application No. 62/488,725, filed on Apr. 22, 2017, provisional application No. 62/488,771, filed on Apr. 23, 2017.

(51) Int. Cl.
| | |
|---|---|
| *B63B 27/36* | (2006.01) |
| *B63B 25/00* | (2006.01) |
| *B63B 35/40* | (2006.01) |
| *B63B 35/00* | (2006.01) |
| *B60F 3/00* | (2006.01) |
| *B63C 13/00* | (2006.01) |

(52) U.S. Cl.
CPC ............... *B63B 27/36* (2013.01); *B60F 3/00* (2013.01); *B63B 25/006* (2013.01); *B63B 25/008* (2013.01); *B63B 35/003* (2013.01); *B63B 35/40* (2013.01); *B63C 13/00* (2013.01); *B63B 2035/001* (2013.01)

(58) Field of Classification Search
CPC ..... B63B 27/36; B63B 25/006; B63B 25/008; B63B 35/003; B63B 35/40
See application file for complete search history.

(56) References Cited

U.S. PATENT DOCUMENTS

| | | | | | |
|---|---|---|---|---|---|
| 3,403,652 | A | * | 10/1968 | Hardy | B60V 1/043 114/259 |
| 3,776,167 | A | * | 12/1973 | Marbury, Jr. | B63B 35/40 114/259 |
| 6,792,886 | B1 | * | 9/2004 | Maloney | B63B 1/06 114/60 |
| 7,296,528 | B1 | * | 11/2007 | Doyle | B63B 27/143 114/258 |
| 7,621,230 | B1 | * | 11/2009 | Anderson | B63B 27/143 114/258 |
| 8,578,872 | B1 | * | 11/2013 | Spellacy | B63B 23/32 114/249 |

(Continued)

*Primary Examiner* — S. Joseph Morano
*Assistant Examiner* — Jovon E Hayes
(74) *Attorney, Agent, or Firm* — John T. Whelan

(57) ABSTRACT

A method includes: loading a vehicle onto a connector boat; loading the loaded connector boat onto the semi-submersible ship; transporting the semi-submersible ship having the loaded connector boat stored thereon to a location; taking water ballast onto the semi-submersible ship at the location; floating the loaded connector boat off of the semi-submersible ship; transporting the loaded connector boat to a second location; unloading the vehicle into water; and transporting the vehicle to a third location.

5 Claims, 45 Drawing Sheets

(56) References Cited

U.S. PATENT DOCUMENTS

| | | | |
|---|---|---|---|
| 2003/0140837 A1* | 7/2003 | O'Neil | B63B 35/42 |
| | | | 114/259 |
| 2006/0086304 A1* | 4/2006 | Menard | B63B 35/42 |
| | | | 114/259 |
| 2007/0151499 A1* | 7/2007 | Maloney | B63B 35/42 |
| | | | 114/259 |
| 2009/0056611 A1* | 3/2009 | Hirayama | B63B 19/08 |
| | | | 114/259 |
| 2009/0158986 A1* | 6/2009 | Kim | B63B 25/16 |
| | | | 114/256 |
| 2010/0000459 A1* | 1/2010 | Colangelo | B63B 27/36 |
| | | | 114/259 |
| 2012/0285360 A1* | 11/2012 | Peuziat | B63B 23/30 |
| | | | 114/259 |
| 2018/0327058 A1* | 11/2018 | Leimbach | B60F 3/00 |

* cited by examiner

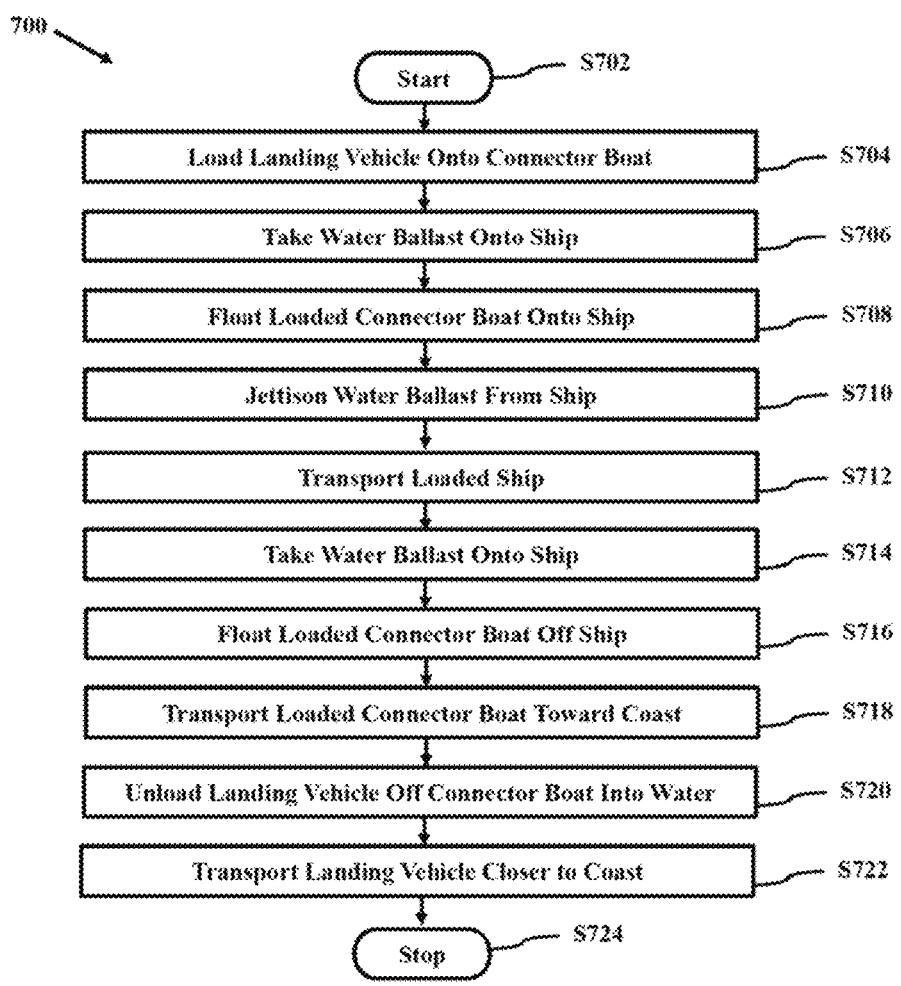

AMPHIBIOUS DEPLOYMENT SYSTEM AND METHOD

The present application claims priority from: U.S. Provisional Application No. 62/445,974 filed Jan. 13, 2017, U.S. Provisional Application No. 62/488,725 filed Apr. 22, 2017 and U.S. Provisional Application No. 62/488,771 filed Apr. 23, 2017, the entire disclosures of which are incorporated herein by reference.

TECHNICAL FIELD

Various embodiments described herein relate generally to systems and methods performing an amphibious landing.

BACKGROUND

In warfare, an amphibious operation uses naval ships to land ground assets on a hostile shore at a designated landing site.

Conventional amphibious operations will now be described with reference to FIGS. 1-6B.

FIG. 1 illustrates a conventional warship 102 loaded with amphibious assault assets for transport to a target landing coastline. As shown in the figure, conventional warship 102 includes: a plurality of combat rubber reconnaissance crafts (CRRCs), a sample of which is indicated as CRRC 104; a plurality of landing craft mechanized (LCM6) vehicles, a sample of which is indicated as LCM6 106 and a plurality of assault amphibious vehicles (AAVs), a sample of which is indicated as AAV 108.

A CRRC is a rubber inflatable boat used by the U.S. military that can carry a maximum of 10 passengers with a maximum payload (including fuel) of 2,756 lb. The speed and range of a CRRC is based on payload, but are about a maximum speed of 21 mph and a general operation range of about 12 miles. A LCM6 or "Mike Boat" is a landing craft designed for carrying vehicles that came to prominence during WWII. An LCM6 can carry about 50 tons of cargo has an operating speed of about 10 mph and a range of about 130 miles.

An AAV is the current amphibious troop transport for the US Marine Corps. An AAV has the capability to transition from water to ground operations without tactical pause. These vehicles typically self-deploy from an amphibious assault ship and can travel about 4-6 miles per hour in the water. There are approximately 700 AAV currently in operation. These current AAVs are being steadily phased-out with an upgraded AAV, wherein the upgraded AAVs have a 20 mile operational range and can travel 8 mph in the water. The AAV will soon be replaced with an upgraded Amphibious Combat Vehicle (ACV).

Returning to FIG. 1, to launch the amphibious assault assets, a door 110 is opened at the stern of ship 102. Each amphibious vehicle is then launched out of the ship into water in order to transport to shore.

FIG. 2 illustrates a plurality of conventional amphibious landing crafts on the shore of a target landing coastline.

As shown in the figure, water 200 meets beach 202. A plurality of amphibious landing craft, a sample of which are indicated as landing craft 204 and CRRC 206 have transported through water 200 to land at beach 202. Further, some of the amphibious landing craft have unloaded land-based vehicles, a sample of which is indicated as tank 208.

FIG. 3 illustrates an example conventional landing craft air cushion (LCAC) amphibious vehicle 302 unloading a tank 304 onto the shore 306 of a target landing site.

As shown in the figure LCAC amphibious vehicle 302 includes a skirt 308 and a starboard ramp 310. LCAC amphibious vehicle 302 can carry about 70 tons at a sustained speed of about 40 mph over water having waves averaging 6 feet for about 200 miles. LCAC amphibious vehicle 302 provides the capability to launch an amphibious assault from up to 50 miles offshore. LCAC amphibious vehicle 302 can easily deploy from an amphibious warship, travel over water and continue onto land without pause. However, a major detriment to such an amphibious assault vehicle is drawn to the actual landing and unloading. To unload a payload, e.g., tanks, vehicles and men, LCAC amphibious vehicle 302 requires about 500 yards to stop, wherein it then needs to deflate the air cushion provided by skirt 308. At this point, LCAC amphibious vehicle 302 becomes a very large, non-moving target. For this reason, LCAC amphibious vehicle 302 is limited in its scope of operation. Accordingly AAVs have a much larger role in amphibious landings.

FIG. 4A illustrates an example conventional AAV 402 traveling through water toward the shore of a target landing site. FIG. 4B illustrates AAV 402 arriving at the shore of the target landing site. FIG. 4C illustrates AAV 402 on land.

Warship 102 may launch an amphibious assault onto a hostile beach with a combination of amphibious landing vehicles. This will be described with greater detail with reference to FIGS. 5-6B.

FIG. 5 illustrates an example conventional amphibious assault in a littoral battlespace. FIG. 5 includes a body of water 502, land 504, warship 102 and AAV 108.

Body of water 502 meets land 504 along a coast 506. Body of water 502 includes an out-of-range area 508 and an in-range area 510. Out-of-range area 508 is separated from in-range area 510 by a demarcation line 512.

As shown in the figure, warship 102 is located in water 502 off coast 506. For purposes of discussion, let out-of-range area 508 be considered a safe area for warship 102, whereas in-range area 510 is an unsafe area, such that demarcation line 512 generally marks a unsafe threshold toward coast 506. In particular, presume that the military strategists in charge of this assault have determined that demarcation line 512 is a sufficient distance as to be over the horizon (OTH) or sufficiently out of range of land-based rockets, which may damage or even sink slow moving warship 102. For purposes of discussion, let demarcation line 512 be 100 miles off coast 506.

In particular, the proliferation of low-cost, extended-range, land-based rockets is pushing demarcation line 512 from 50 miles off coast 506, to 66 miles or even now—100 miles off coast 506. For purposes of discussion, let demarcation line 512 be 100 miles off coast 506.

In this example, warship 102 is located at position 514 within in-range area 510. As such, warship 102 is either not OTH or is in range of land-based rockets. Therefore, slow moving warship 102 is at risk of damage. Further, for purposes of discussion, let the mission of warship 102 specify an amphibious landing by AAV 108 at a landing site 518 of coast 506.

As mentioned above. AAV 108 has an operation range of about 20 miles. Therefore, position 514 should be within 20 miles of coast 506. This is in relative terms, extremely close for land-based rockets and puts warship 102 at great risk. Furthermore, as mentioned above, AAV 108 has a max speed of about 8 mph. Accordingly, to travel 20 miles, AAV 108 will have to travel for about 2.5 hours from warship 102 at position 514 to landing site 518. Warship 102 may stay at position 514 to provide support for AAV 108 while it travels to landing site 518 and thus increase the chances of taking damage from land-based rockets. Alternatively, warship 102 may abandon AAV 108 after deployment and sail past demarcation line 512 to out-of-range area 508, thus increasing its safety while leaving AAV 108 without support. Either situation is not desirable.

Consider the situation where a CRRC is deployed from warship 102 at location 514. As mentioned above, a CRRC has an operating speed of about 21 mph and typically has an operating range of about 12 miles. However, for purposes of discussion, in this example a CRRC is used outside of the normal operating range—about 20 miles as deployed from location 514. Accordingly, to travel 20 miles, a CRRC will have to travel for about 1 hour from warship 102 at position 514 to landing site 518. Again, warship 102 may either stay at position 514 to provide support for the CRRC while it travels to landing site 518 and thus increase the chances of taking damage from land-based rockets, or warship 102 may abandon the CRRC after deployment and sail past demarcation line 512 to out-of-range area 508, thus increasing its safety while leaving the CRRC without support. Either situation is not desirable.

To avoid the problematic situations discussed above, consider another conventional amphibious assault wherein warship 102 deploys amphibious assets beyond demarcation line 512. This will be described with reference to FIGS. 6A-B.

FIG. 6A illustrates another example conventional amphibious assault using AAV 108 in a littoral battlespace. Like the example of FIG. 5, FIG. 6A includes body of water 502, land 504, warship 102 and AAV 108.

In this example, warship 102 is located at position 602 within out-of-range area 508. As such, warship 102 is OTH and has a decreased chance of taking damage from land-based rockets. Further, for purposes of discussion, let the mission of warship 102 still specify an amphibious landing by AAV 108 at landing site 518 of coast 506.

As mentioned above, AAV 108 has an operation range of about 20 miles. In this example, as warship 102 is beyond demarcation line 512, warship 102 is well beyond 100 miles from landing site 518. Therefore, if deployed from warship 102 at position 602, AAV 108 would not reach landing site 518. On the contrary, AAV would only make it to point 604 within in-range area 510. Such a situation is not desirable. To avoid a stranded-at-sea AAV 108 situation, an LCM6 might be utilized for an amphibious assault from warship 102 at location 602. This will be described with reference to FIG. 6B.

FIG. 6B illustrates another example conventional amphibious assault using LCM6 106 in a littoral battlespace. Like the example of FIG. 5, FIG. 6B includes body of water 502, land 504, warship 102 and LCM6 106.

In this example, warship 102 is located at position 602 within out-of-range area 508. As such, warship 102 is OTH and has a decreased chance of taking damage from land-based rockets. Further, for purposes of discussion, let the mission of warship 102 still specify an amphibious landing by LCM6 106 at landing site 518 of coast 506.

As mentioned above, LCM6 106 has a typical operation range of about 20 miles, but a total range of about 130 miles. As further mentioned above, an LCM6 has an operating speed of about 10 mph. Accordingly, warship could deploy LCM6 106 from past demarcation line 512. However, at 100 miles from shore 506, traveling at 10 mph, it would take LCM6 106 10 hours to reach landing site 518. Such a long arrival time is not desirable.

A Ship to Shore Maneuver Exploration and Experimentation Task Force (S2ME2 TF) was commissioned in August 2015 to develop concepts and conduct prototype experiments and demonstrations to investigate new operational and technical capabilities that enable expeditionary teams to achieve their objectives. A S2ME2 TF fleet engagement team conference of November 2016 provides a special notice that includes a Concept of Operations (CONOP). The CONOP includes a discussion as follows:

"A national Marine Expeditionary Brigade (MEB) conducts an amphibious assault against a peer adversary, with a focus on surface assault and inland maneuver. The Amphibious Force maneuvers at range to minimize impact of threat intelligence, surveillance, and reconnaissance (ISR) and weapons while conducting shaping operations to establish conditions for the landing. As conditions are established that negate enemy long range missiles, the amphibious force will project power ashore via strikes, raids, and other maneuvers in support of the establishment of sea control, the further reduction of enemy threats, and to secure entry points. Marines will conduct raids and strike missions from extended ranges (18-100 miles) to reduce the enemy's threats within the littoral battlespace, raise enemy signatures for subsequent targeting; and secure entry points."

Land-based rockets in the littoral battle space are increasing range such that a line a demarcation for safety of a warship is pushing 100 miles off coast. However, there is no current viable amphibious landing system that is able to quickly deliver assets from a warship that is 100 miles off coast to a landing site.

Accordingly, for at least the foregoing reasons there exists a need for an amphibious landing system and method that is able to quickly deliver assets from a warship that is 100 miles off coast to a landing site.

SUMMARY

The present invention provides an improved system and method for performing an amphibious landing.

Various embodiments described herein are drawn to a method that includes: loading a vehicle onto a connector boat; loading the loaded connector boat onto the semi-submersible ship; transporting the semi-submersible ship having the loaded connector boat stored thereon to a location; taking water ballast onto the semi-submersible ship at the location; floating the loaded connector boat off of the semi-submersible ship; transporting the loaded connector boat to a second location; unloading the vehicle into water and transporting the vehicle to a third location.

In some embodiments, the loading of a vehicle onto a connector boat includes loading an amphibious vehicle onto the connector boat. In other of these embodiments, the loading of the loaded connector boat onto the semi-submersible ship includes: taking water ballast onto the semi-submersible ship; floating the loaded connector boat onto the semi-submersible ship; and jettisoning the water ballast from the semi-submersible ship. In still other of these embodiments, the method further includes loading a second amphibious vehicle onto the connector boat prior to taking water ballast onto the semi-submersible ship. In still yet other of these embodiments, the method further includes: loading a second amphibious vehicle onto a second connector boat; floating the second loaded connector boat onto the semi-submersible ship; floating the second loaded connector boat off of the semi-submersible ship; transporting the second loaded connector boat to the second location; unloading the second amphibious vehicle into the water, and transporting the second amphibious vehicle to the third location. In further still yet other of these embodiments, the loading an amphibious vehicle onto a connector boat includes fastening, by way of a detachable securing mechanism, the amphibious vehicle to the connector boat to prevent movement of the amphibious vehicle within the connector boat. In further still yet other of these embodiments, the method further includes: connecting a detachable power conduit from the connector boat to the amphibious vehicle; generating electrical power via the connector boat; and providing, via the power conduit, the electrical power generated by the connector boat to the amphibious vehicle.

As used herein, the term "transporting" may comprise any known method of moving from one point to another, non-limiting examples of which include sailing, paddling and propelling.

In some embodiments, the loading of a vehicle onto a connector boat includes loading a raft onto the connector boat. In other of these embodiments, the loading of the loaded connector boat onto the semi-submersible ship includes: taking water ballast onto the semi-submersible ship; floating the loaded connector boat onto the semi-submersible ship; and jettisoning the water ballast from the semi-submersible ship. In still other of these embodiments, the method further includes loading a second raft onto the connector boat prior to taking water ballast onto the semi-submersible ship. In still yet other of these embodiments, the method further includes: loading a second raft onto a second connector boat; floating the second loaded connector boat onto the semi-submersible ship; floating the second loaded connector boat off of the semi-submersible ship; transporting the second loaded connector boat to the second location; unloading the second raft into the water; and transporting the second raft to the third location.

As used herein, the term "raft" may comprise a CRRC or other rigid or semi-rigid craft such as those sold under the brand name, "Zodiac".

In some embodiments, the method further includes loading a second vehicle onto a shoreline landing craft, wherein the loading of a vehicle onto a connector boat includes loading the loaded shoreline landing craft onto the connector boat. In other of these embodiments, the loading of the loaded connector boat onto the semi-submersible ship includes: taking water ballast onto the semi-submersible ship; floating the loaded connector boat onto the semi-submersible ship; and jettisoning the water ballast from the semi-submersible ship. In still other of these embodiments, the method further includes loading a second vehicle onto a second shoreline landing craft; loading the second shoreline landing craft onto a second connector boat; floating the second loaded connector boat onto the semi-submersible ship; floating the second loaded connector boat off of the semi-submersible ship; transporting the second loaded connector boat to the second location; unloading the second shoreline landing craft into the water; transporting the second shoreline landing craft to the third location; and unloading the second vehicle onto the shore of the coastline.

In some embodiments, the loading of the loaded connector boat onto the semi-submersible ship includes loading the loaded connector boat onto the semi-submersible ship via a crane.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 7 illustrates the example amphibious assault method in accordance with various embodiments of the present invention;

DETAILED DESCRIPTION

Figure 1:
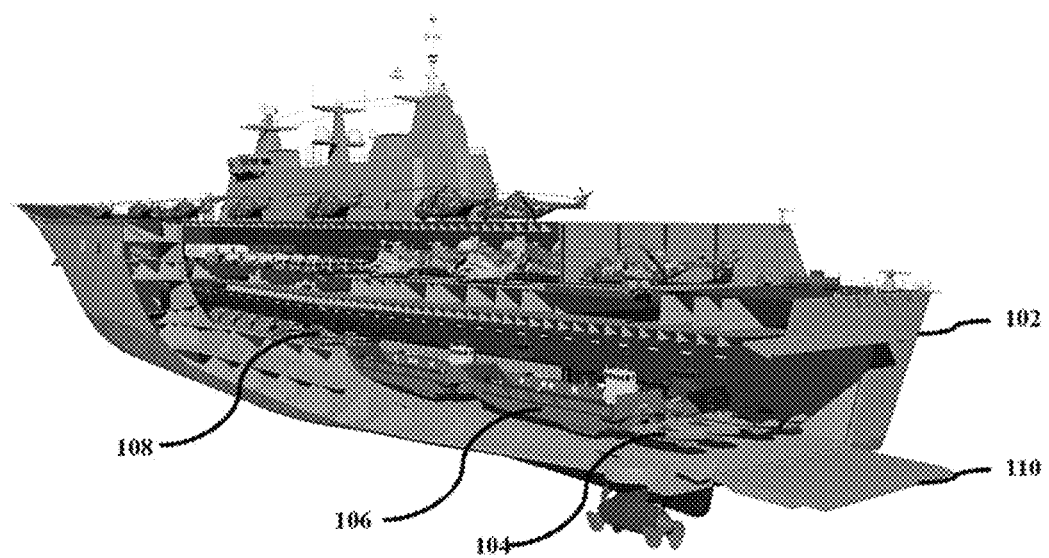
FIG. 1 illustrates a conventional warship loaded with amphibious assault assets for transport to a target landing coastline.
Figure 2:
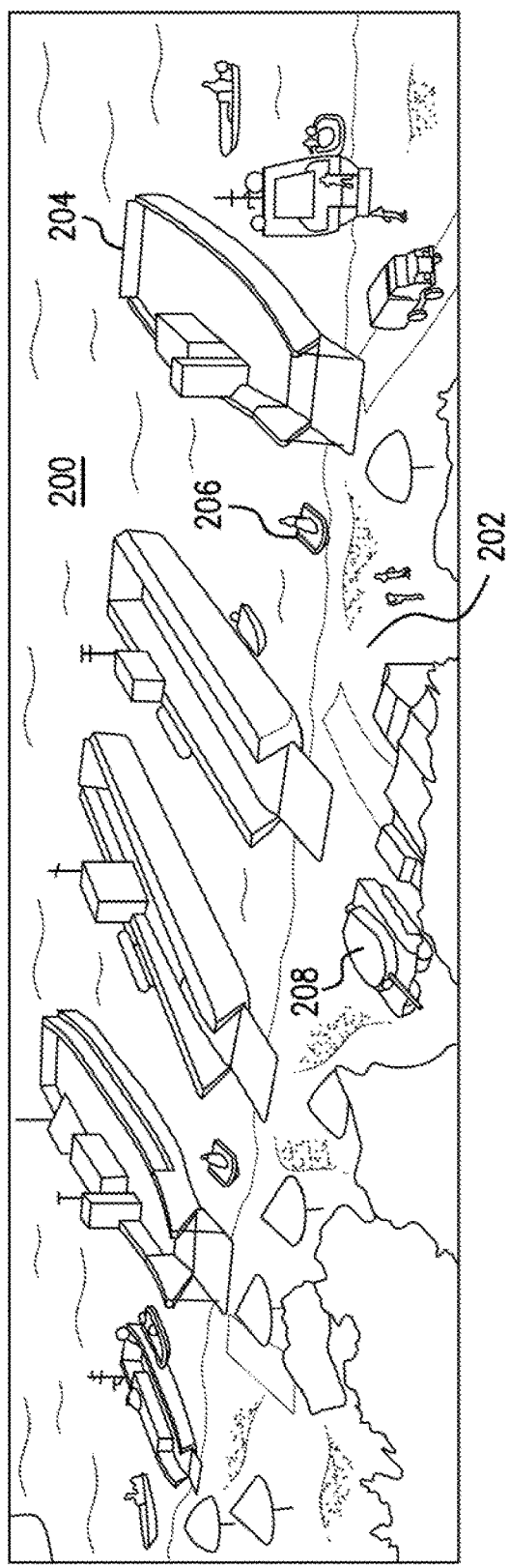
FIG. 2 illustrates a plurality of conventional amphibious landing crafts on the shore of a target landing coastline.
Figure 3:
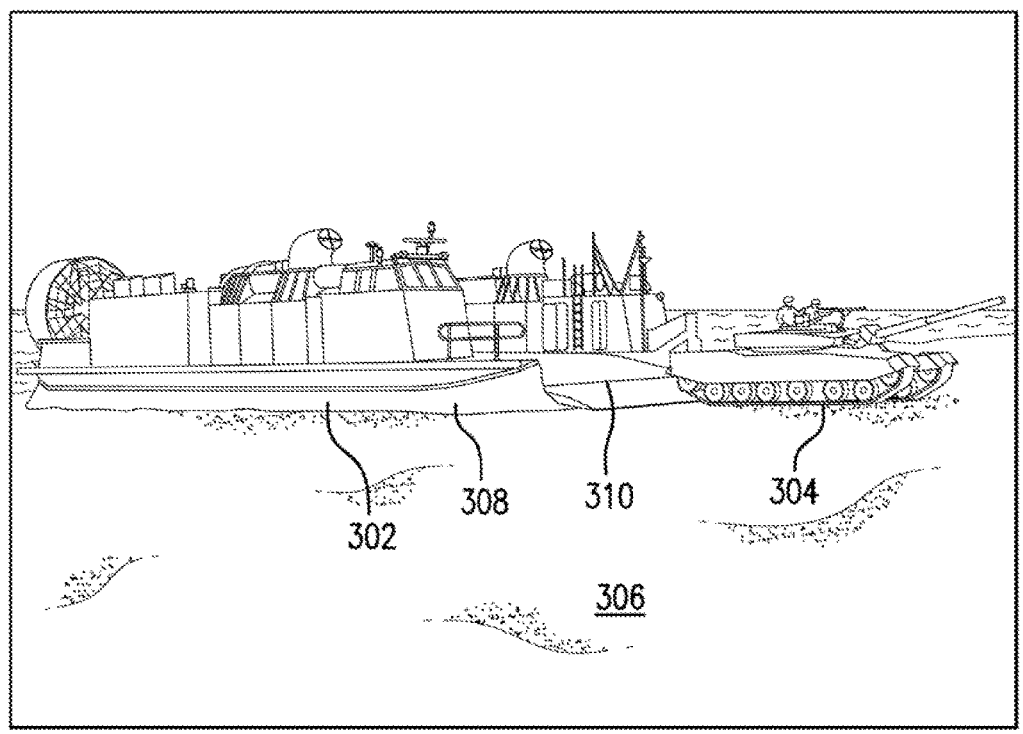
FIG. 3 illustrates an example conventional landing craft air cushion class amphibious vehicle unloading a tank onto the shore of a target landing site.
Figure 4A:
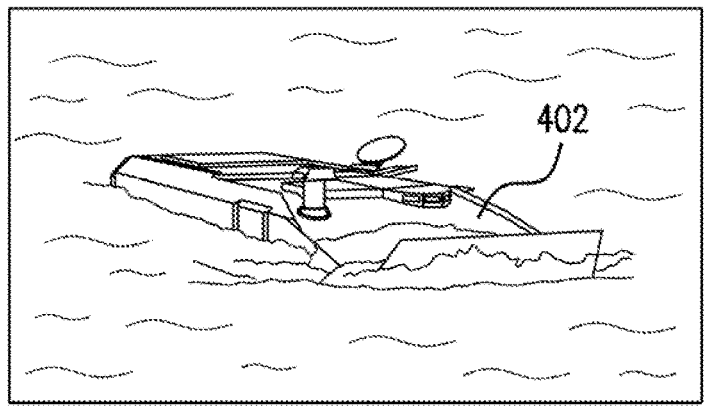
FIG. 4A illustrates an example conventional amphibious combat vehicle traveling through water toward the shore of a target landing site.
Figure 4B:
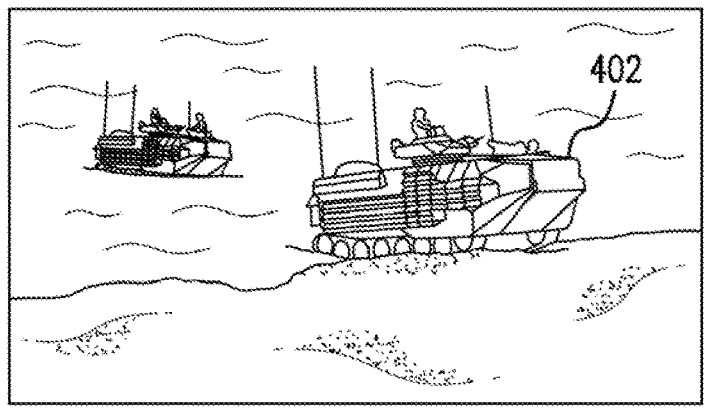
FIG. 4B illustrates the conventional amphibious combat vehicle of FIG. 4A arriving at the shore of the target landing site.
Figure 4C:
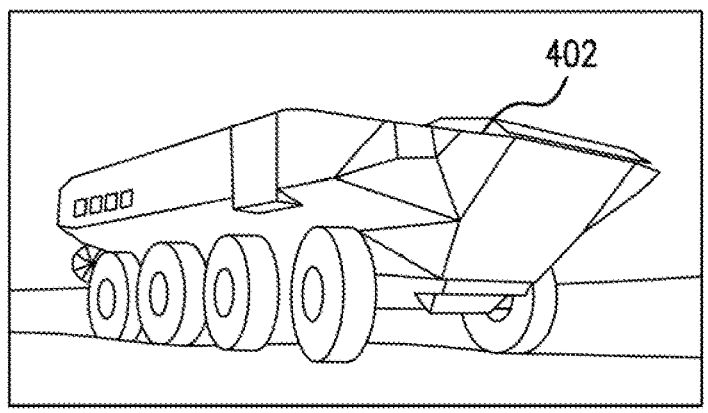
FIG. 4C illustrates the conventional amphibious combat vehicle of FIG. A on land.

Various embodiments of the present invention are drawn to an improved, more efficient system and method to launch an amphibious landing.

Marine Corps Doctrinal Publication (MCDP)-1 states: "Maneuver warfare is a warfighting philosophy that seeks to shatter the enemy's cohesion through a variety of rapid, focused, and unexpected action which create a turbulent and rapidly deteriorating situation with which the enemy cannot cope." The Maneuver Warfare philosophy remains as relevant today as it was when published. In contemporary practice, it requires both the physical and cognitive aspects of war, combined with a level of capability and capacity overmatch for which the Marine Corps strive.

The Marine Corps desire delivery systems capable of maneuvering troops, and material and delivering effects to conduct early raids and other shaping activities from distance. Capability increments of interest include the ability to: support the insertion of reconnaissance forces—six to eight man teams (e.g., reconnaissance teams in low-observable boats, submersibles, swimmer-assistance devices, etc.); support the insertion of early assault teams—18 to 27 14-man teams with light material (e.g., two infantry rifle companies, to include EOD and engineers in low observable boats, high speed boats, amphibious craft, amphibious assault vehicles, etc.); and support the insertion of conventional forces with heavy material (e.g., one or two weapons companies, one light armored reconnaissance company, and one tank company in surface connectors, semi-submersibles, hovercraft, wing-in-ground effect vehicles, unmanned heavy logistics craft, etc.).

Examples of metrics for connectors include: range, persistence, speed, maneuverability, payload capacity, payload flexibility, modularity, stealth, sortie rate, optionally manned/unmanned, cost. For heavy material delivery, additional metrics may include: beaching capability, sea keeping (stability), ballast adjustability (to support loading and unloading), novel material delivery concepts, novel unloading concepts, novel beach landing concepts, armor, and protective systems.

The conventional thought for an amphibious landing, up to this point, has been that there is a need for an amphibious landing craft that can be launched from a warship in an out-of-range area in a littoral region and that can travel quickly to a landing site. However, as discussed above with reference to FIGS. 5-6B, such need as not been fulfilled. Either: the warship must launch an amphibious assault from an in-range area, as discussed with reference to FIG. 5, and be subjected to land-based enemy fire; the warship must launch an amphibious assault from an out-of-range area, wherein the amphibious vehicle cannot make it to the landing site as discussed above with reference to FIG. 6A; or the warship must launch an amphibious assault from an out-of-range area, but the type of amphibious vehicle that must be used is limited and takes too long to land as discussed with reference to FIG. 6B.

The present invention addresses this long felt need by using a combination of a FLO/FLO ship loaded with a plurality of connector boats, each of which are loaded with amphibious landing vehicles or other payload. In this manner, the FLO/FLO ship can quickly deploy the plurality of connector boats in parallel from an out-of-range area. Each connector boat can quickly travel deep into the in-range area, closer to shore, and then deploy the amphibious landing vehicles or other payload toward the landing site.

In accordance with various embodiments of the present invention, a plurality of connector boats are deployed from a single FLO/FLO ship. Each connector boat may be used to support the insertion of reconnaissance forces using a number of amphibious landing vehicles. In this manner, the connector boats can transport many amphibious landing vehicles from 100 miles to approximately 5 miles off shore in 3.5-5 hours along a 100 mile beach front.

A FLO/FLO ship is a semi-submersible ship that can take on water or other ballast to allow the load, usually another vessel, to be floated over and onto the deck. The ballast is then jettisoned and the ship's deck and cargo are raised above the water line. Similarly, the ship that can again take on water ballast to allow the load to be floated over and off of the deck. The ballast is then jettisoned and the ship's empty deck is raised above the water line. In this manner, a vessel can float-on and float-off the deck, hence the term FLO/FLO.

In accordance with various embodiments of the present invention, six connector boats are used to support the insertion of reconnaissance forces using combat rubber reconnaissance craft (CRRC). In this manner, the six connector boats can transport up to 48 six to eight man teams from 100 miles to approximately 5 miles offshore in 3.5-5 hours along a 100 mile beach front.

In accordance with various embodiments of the present invention, 16 connector boats are used to move early assault teams of 32 assault vehicles, including 26 AAVs and 6 LAVs, from 100 miles to approximately 5 miles off shore in 3.5-5 hours along a 100 mile beach front.

In accordance with various embodiments of the present invention, 16 connector boats are used to move early assault vehicles of conventional forces, including 26 AAVs and 6 LAVs, from 100 miles to approximately 5 miles off shore in 3.5-5 hours along a 100 mile beach front.

In accordance with various embodiments of the present invention, connector boats enable loitering for multiple hours at +/−5 miles offshore to reposition CRRCs, AAVs or ACVs, to return wounded to a sea base or to support other damaged connector boats.

In accordance with various embodiments of the present invention, connector boats are able to return to a sea base for unloading, reloading and redeployment.

In accordance with various embodiments of the present invention, a single small FLO/FLO ship may be used to transport and simultaneously launch 6 connector boats, each carrying eight CRRCs, which include 300 marines.

In accordance with various embodiments of the present invention, a single larger FLO/FLO ship may be used to transport and simultaneously launch 16 connector boats, which include over 750 marines.

Non-limiting example amphibious landings in accordance with various embodiments of the present invention will now be described with reference to FIGS. 7-38.

A first non-limiting example amphibious landing in accordance with various embodiments of the present invention will now be described with reference to FIGS. 7-32.

FIG. 7 illustrates the example amphibious assault method in accordance with various embodiments of the present invention.

As shown in the figure, method 700 starts (S702) and landing vehicles are loaded onto a connector boat (S704). In an example embodiment, the landing vehicles are loaded onto a connector boat at a staging site, which is safely separated from a proposed landing site.

Figure 8:
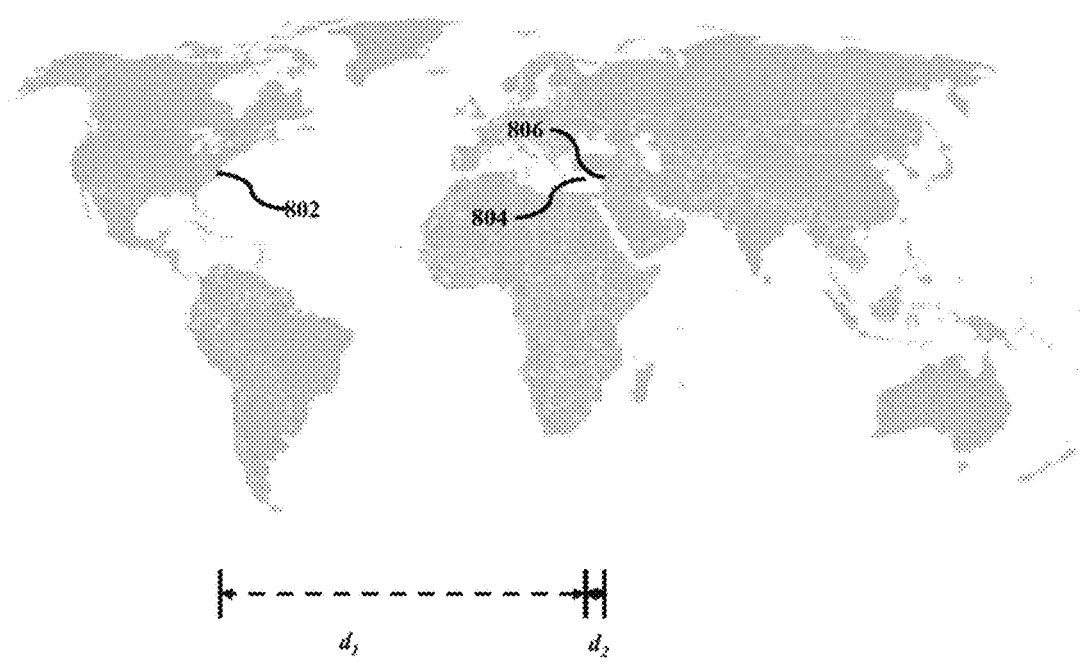
FIG. 8 illustrates a global map having a loading site, a transport distance, a deployment site and an assault site in accordance with various embodiments of the present invention.

FIG. 8 illustrates a global map having a staging site, a transport distance, a deployment site and an assault site in accordance with various embodiments of the present invention.

FIG. 8 includes a staging site 802, a primary deployment location 804 and a secondary deployment location 806. Staging site 802 is separated from primary deployment location 804 by a distance $d_1$, whereas primary deployment location 804 is separated from secondary deployment location 806 by a distance $d_2$, wherein $d_1 >>> d_2$.

Connector boats are loaded with amphibious vehicles and crew at staging site 802.

A connector boat in accordance with various embodiments of the present invention may have the following non-limiting properties: a load capacity of 120 metric tons (including fuel, crew and supplies), have a length of 42 m, have an operational range of 300-500 miles, have a top speed of 28 knots when fully loaded and 32 knots with a light load, be autonomous or have a crew of 2-4 crewmembers, have a low profile, have an armored bridge, have a multi-step vehicle deck for rapid deployment of vehicles without the need of crew, have seating accommodations for 50 troops, have an on-board defense counter measures, have on-board offensive guns, have on-board drones and accompanying drone launching/receiving systems and combinations thereof. More specifically, a connector boat in accordance with various embodiments of the present invention may use on-board defensive counter measures to address enemy vessels that may be dispatched to attack the connector boat. Further, a connector boat in accordance with various embodiments of the present invention may use or carry on-board offensive guns, such as artillery, rockets, missile and/or rocket launchers and the like, to strike beach defenses at the assault site. Still further, a connector boat in accordance with various embodiments of the present invention may launch a plurality of different types of drones for reconnaissance and assault of the assault site.

Figure 9:
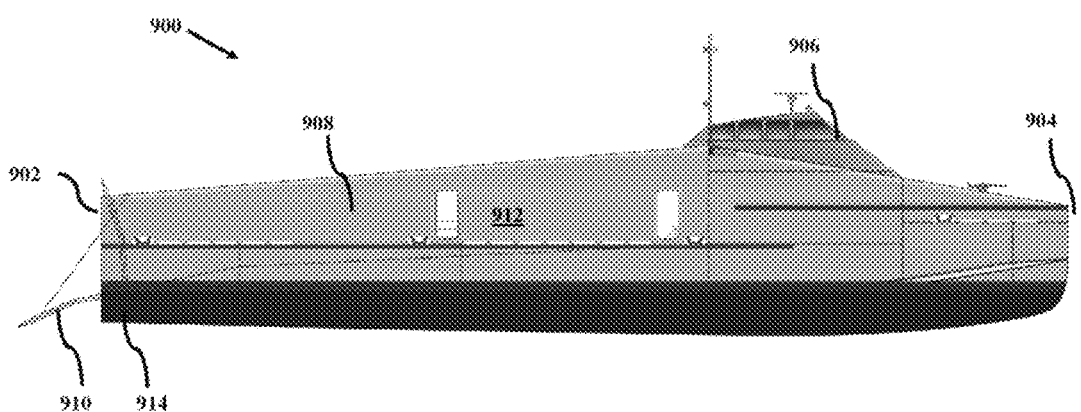
FIG. 9 illustrates an example connector boat in accordance with various embodiments of the present invention.

FIG. 9 illustrates a non-limiting example of connector boat 900 in accordance with various embodiments of the present invention.

As shown in the figure, connector boat 900 includes a stern 902, a bow 904, a cabin 906, a hold 908, a stern ramp 910, a port side (not shown), a starboard side 912 and a hull 914.

While in the water at staging site 802, connector boat 900 may be loaded with amphibious landing vehicles, such as any of a CRRC, an AAV an LCM6 or combinations thereof. Still further, it should be noted that connector boat 900 may be additionally or alternatively be loaded with cargo, materials, weapons, systems, vehicles, armament or the like (collectively, "payload") that may be needed in an amphibious landing. Still even further, it should be noted that connector boat 900 may be additionally loaded with cargo, materials and any other weapons or systems or payload that may be needed in an sea-based assault, such as for example a landing at floating structure such as a sea-based oil drilling platform or an attack on another seafaring vessel.

It should be noted that LCM6 is discussed herein merely for purposes of discussion and that any amphibious mechanized landing craft that can fit on a connector boat in accordance with various embodiments of the present invention may be used in accordance with various embodiments of the present invention. It should be further noted that an amphibious mechanized landing craft to be loaded onto connector boat 900 may additionally have cargo or other military assets stored thereon, non-limiting examples of which include land-based vehicles, manned and unmanned vehicles.

These amphibious landing vehicles may be loaded onto connector boat 900 by any known manner, non-limiting examples of which include via dock crane or by driving up stern ramp 910. As will be discussed in more detail below, stern ramp 910 enables loading and deployment of amphibious landing vehicles from connector boat 900 while at sea.

In accordance with an aspect of the present invention, in an example connector boat, a pocketed stern ramp allows the hull to support the stern ramp. This reduces loads on pin connections where the stern ramp is attached to the hull. This will be described in greater detail with reference to FIG. 10.

Figure 10:
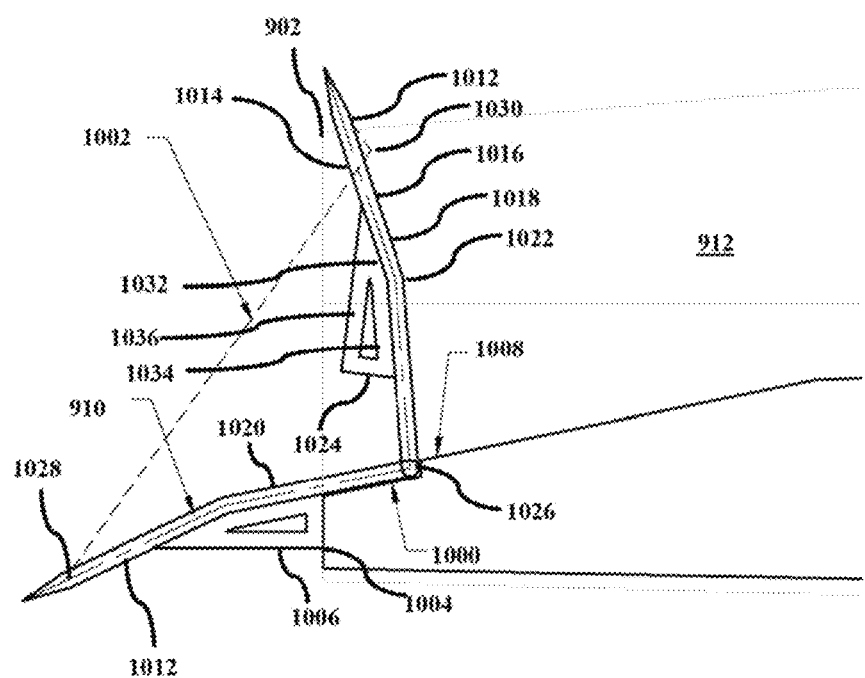
FIG. 10 illustrates an example ramp pocket and support of the connector boat of FIG. 9.

FIG. 10 illustrates an example ramp pocket 1000 and support of connector boat 900. The figure includes a ramp support cable 1002, a hull transom 1004, a stern ramp support 1006, a sloped vehicle deck 1008, stern ramp pocket 1000, stern ramp 910 in a down position 1010, and stern ramp 910 in an up position 1012. Stern ramp 910 includes a stern ramp back side 1014, a stern ramp front side 1016, a stern ramp portion 1018, a stern ramp portion 1020, and a stern ramp corner 1022. Stern ramp support 1006 includes a stern ramp support back side 1024. A connection pin 1026 rotatably connects stern ramp 1006 to sloped vehicle deck 1008. It should be noted that another connection pin (not shown) is positioned on the port side (not shown) of connector boat 900.

One end of ramp support cable 1002 is connected to stern ramp 910 at stern ramp connection point 1028 whereas another end of ramp support cable 1002 is connected to a boat connection point 1030 on an inner side of starboard side 912 of connector boat 900. A second ramp support cable (not shown) is provided on a port side (not shown) and connects a port side of stern ramp 910 to an inner side of port side of connector boat 900. The two ramp support cables, including ramp support cable 1002 provide support to stern ramp 910 when amphibious vehicles ride up stern ramp 910 from the sea when loading onto connector boat 900 and when amphibious vehicles ride off stern ramp 910 into the sea when deploying from connector boat 900. This support prevents deformation of stern ramp 910 when loaded by loading and deploying heavy amphibious vehicles.

In addition to back side 1024, stern ramp support 1006 includes a sloped side 1032, a sloped side 1034 and a strait side 1036. Strait side 1036 is disposed perpendicular to back side 1024. Sloped side 1032 is attached to stern ramp back side 1014 of stern ramp portion 1018, whereas sloped side 1034 is attached to stern ramp back side 1014 of stern ramp portion 1020. Stern ramp support 1006 may be attached to stern ramp 910 by any known method, a non-limiting example of which includes by welding.

When stern ramp 910 is in down position 1010, stern ramp support 1006 is positioned such that back side 1024 abuts hull transom 1004. In this manner, stern ramp support 1006 provides additional support for stern ramp 910 when amphibious vehicles ride up stern ramp 910 from the sea when loading onto connector boat 900 and when amphibious vehicles ride off stern ramp 910 into the sea when deploying from connector boat 900.

Stern ramp portion 1018 and a stern ramp portion 1020 are, in actuality, a single element that is bent at stern ramp corner 1022. This shape of stern ramp 910 minimizes the height of stern ramp relative to the water surface, thereby reducing the needed length of a ramp needed for an amphibious vehicle to ride up and into connector boat 900. Further, this bent design reduces associated design loads, which will reduce weight and complexity of stern ramp 910 and the accompanying stern ramp hoisting system (not shown).

Connection pin 1026 is disposed in stern ramp pocket 1000 such that part of stern ramp portion 1020 rests in stern ramp pocket 1000 when stern ramp 910 is in down position 1010. In this manner, when stern ramp 910 is in down position 1010, there is a seamless transition from sloped vehicle deck 1008 to stern ramp 910, which eases deployment of amphibious vehicles from connector boat 900 into the water.

When transporting vehicles from point to point, stern ramp 910 is locked in up position 1012 to protect the vehicles loaded in connector boat 900 and to prevent water from flooding sloped deck 1008. Stern ramp 910 may then be lowered to down position 1010 to load or deploy vehicles as needed.

Another aspect of connector boat 900 is drawn to the high side coaming 1102. This will be described in greater detail with reference to FIG. 11.

Figure 11:
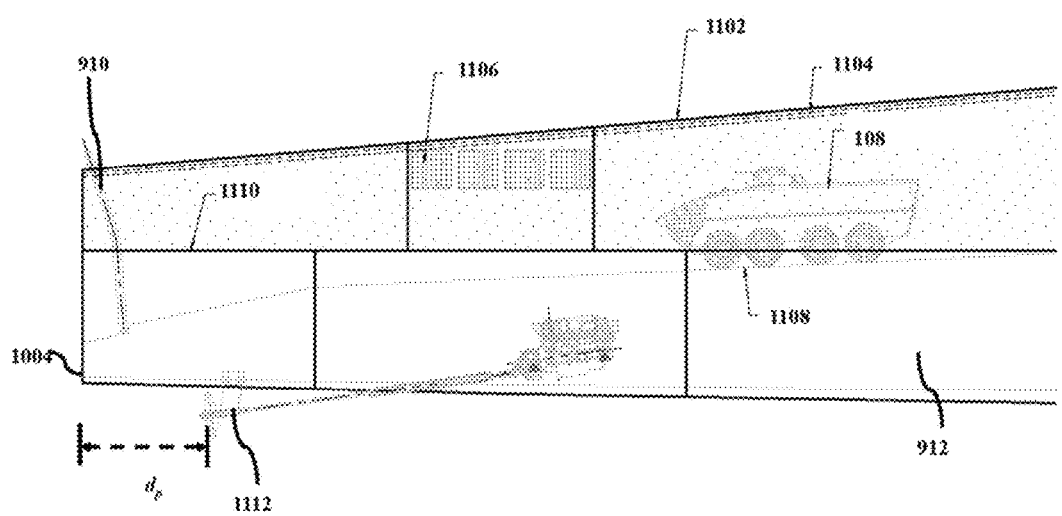
FIG. 11 illustrates an example side coaming of the connector boat of FIG. 9.

FIG. 11 illustrates an example side coaming 1102 of connector boat 900.

As shown in the figure, connector boat 900 includes high side coaming 1102, an optional deck cover 1104, a plurality of ventilators—a sample of which is indicated as ventilator 1206, sloped vehicle deck 1008, a main deck outboard 1110 and a propeller 1112.

High side coaming 1102 along the periphery of connector boat 900 provides many functions. First, high side coaming 1102 disguises equipment, cargo or vehicles being transported by connector boat 900. Second, high side coaming 1102 provides protection to from heavy seas and enemy fire for equipment, cargo or vehicles being transported by connector boat 900. Third, high side coaming 1102 reduces sear spray into the engine room air ventilation trunks (not shown). Fourth, high side coaming 1102 provides a surface from which a protective top (optional) could be installed, thereby offering a fully enclosed vehicle space.

Sloped vehicle deck 1008 provides many functions. First, sloped vehicle deck 1008 lowers the center of gravity of connector boat 900 with equipment, cargo or vehicles onboard while maintaining high freeboard around a periphery of connector boat 900, thus enhancing overall stability and freeboard of connector boat 900. Second, sloped vehicle deck 1008 accelerates the launching of vehicles due to assistance of gravity and reduced deck height in the way of stern ramp 910.

The ventilators, including ventilator 1106, provide fresh air to inside of connector boat where the amphibious vehicles are located in the event the optional protective top is installed.

Propeller 1112 is disposed below connector boat 900 a distance, $d_p$, from hull transom 1004. This position of propeller 1112 prevents damage to stern ramp 910 when in down position 1010, prevents damage to vehicles when boarding from the sea onto stern ramp 910, prevents damage to vehicles when deploying vehicles off stern ramp 910 into the sea.

The layout of decks of connector boat 900 will now be described with reference to FIGS. 12-13.

Figure 12:
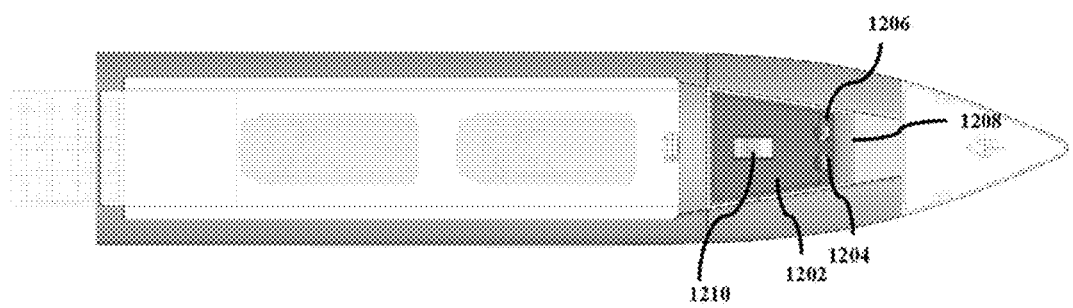
FIG. 12 is a plan view of the upper deck of the connector boat of FIG. 9.

FIG. 12 is a plan view of the upper deck 1202 of connector boat 900.

As shown in the figure, upper deck 1202 includes a pilot chair 1204, a copilot chair 1206, a windshield 1208 and a stairway 1210 to a lower deck.

Figure 13:
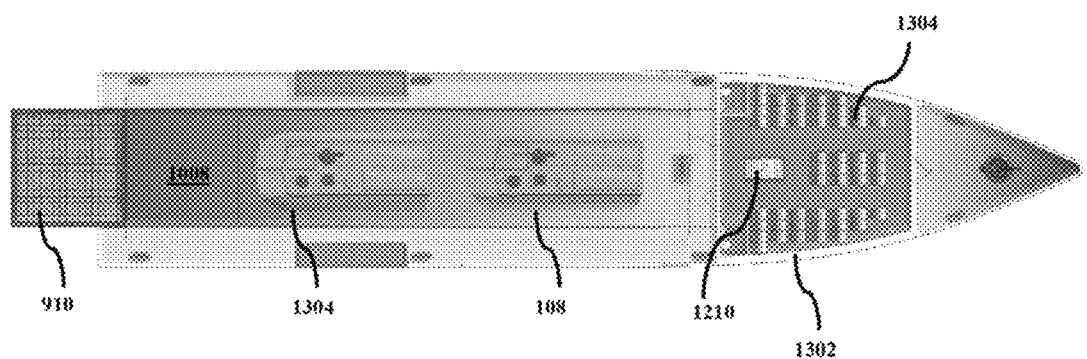
FIG. 13 is a plan view of the lower deck of the connector boat of FIG. 9 loaded with two amphibious assault vehicles.

FIG. 13 is a plan view of a lower deck 1302 of connector boat 900 loaded with two AAVs.

As shown in the figure, connector boat 900 includes AAV 108 and an AAV 1304 loaded in hold 908 on sloped vehicle deck 1008. Connector boat 900 has lower deck 1302, which includes a plurality of personnel seats 1302 and stairway 1210 to upper deck 1202. Personnel may use passenger seats 1302 when connector boat deploys at a primary deployment location from a FLO/FLO ship and sails to a second deployment location off the coast of a landing site. This will be described in greater detail below.

As mentioned previously, connector boat 900 may be loaded with a combination of vehicles, personnel and cargo.

Figure 14:
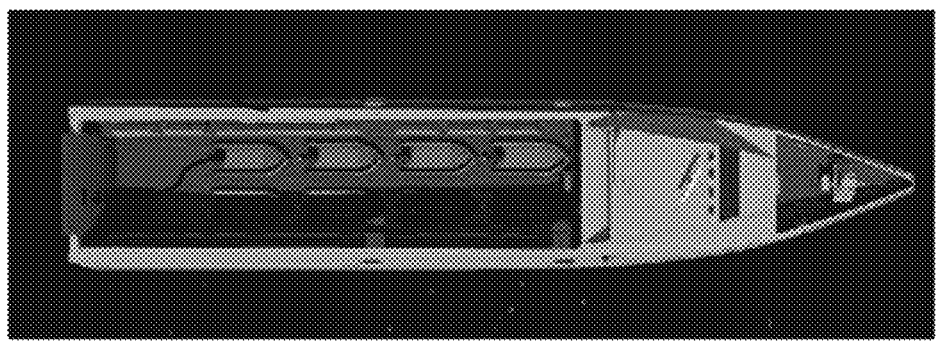
FIG. 14 is a top view of the connector boat of FIG. 9 loaded with eight combat rubber reconnaissance craft.

FIG. 14 is a top view of connector boat 900 loaded with eight CRRCs, a sample of which is indicated as CRRC 1402.

Figure 15:
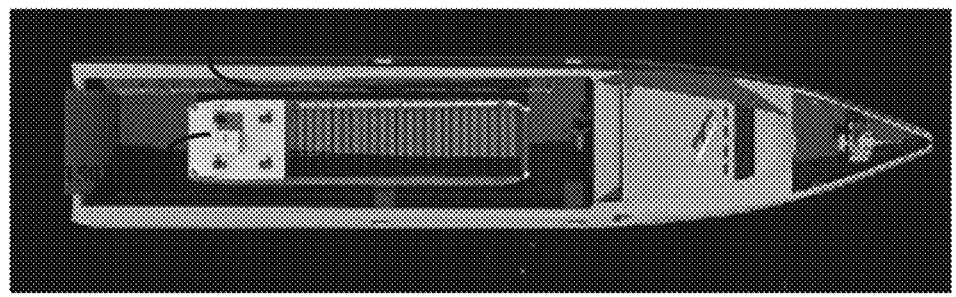
FIG. 15 is a top view of the connector boat of FIG. 9 loaded with a landing craft mechanized.

FIG. 15 is a top view of connector boat 900 loaded with an LCM 1502.

When vehicles are loaded on connector boat 900, it is beneficial for such loaded vehicles to be restrained from unwanted motion during transport. To achieve this goal, vehicles may be locked down to connector boat 900 with a quick release system while in transport. This will be described in greater detail with reference to FIG. 16.

Figure 16:
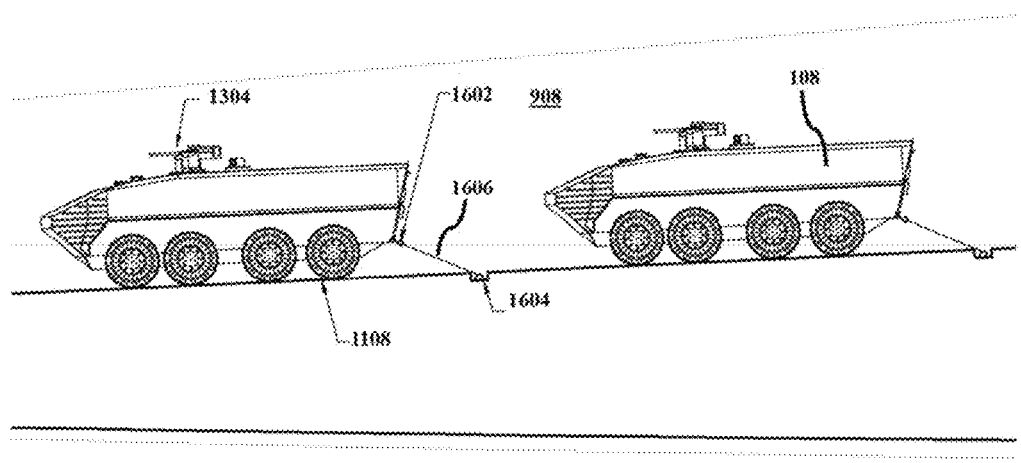
FIG. 16 illustrates an example quick release system for securing amphibious vehicles in the connector boat of FIG. 9.

FIG. 16 illustrates an example quick release system for securing amphibious vehicles in connector boat 900. FIG. 16 includes a cross-sectional view of a portion of connector boat 900, wherein hold 908 is loaded with AAV 108 and AAV 1304.

Each of AAV 108 and AAV 1304 includes a securing mechanism thereon, a sample of which is indicated as securing mechanism 1602 located at the rear of AAV 1304. Sloped deck 1008 includes a plurality of recessed securing pockets, a sample of which is indicated as recessed securing pocket 1604. Each of AAV 108 and AAV 1304 is secured to sloped deck 1110 by way of a securing cable, a sample of which is indicated as securing cable 1606.

In accordance with an aspect of the present invention, in an example connector boat, an integrated quick release mechanism enables amphibious vehicles and other buoyant deck loads to float free from the connector boat in case of catastrophic vessel damage. This will be described in greater detail with reference to FIGS. 17 A-B.

Figure 17A:
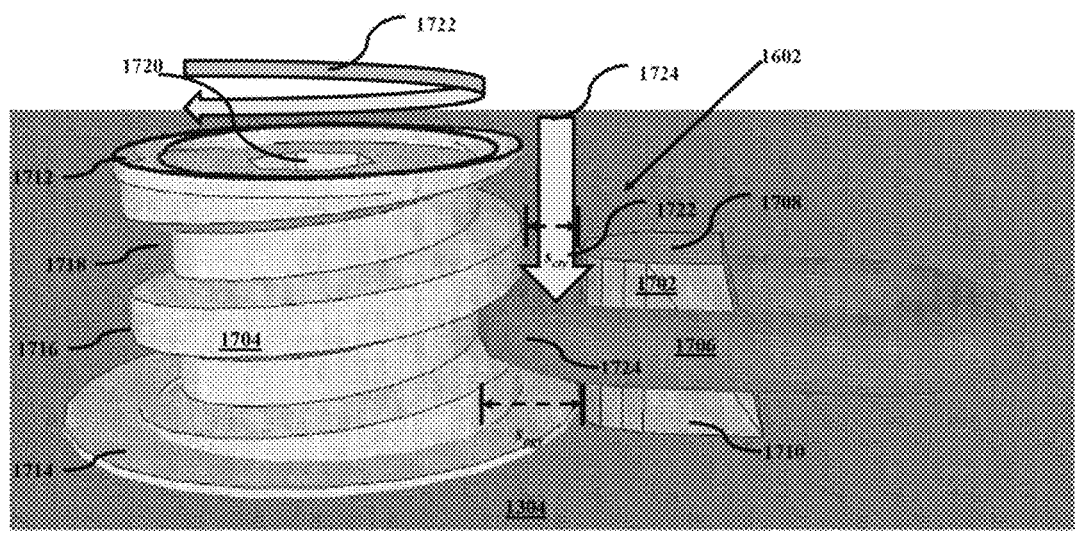
FIG. 17A illustrates a securing mechanism, in accordance with various embodiments of the present invention, in a secured state.

FIG. 17A illustrates an example of securing mechanism 1602 in a secured state.

As shown in the figure, securing mechanism 1602 includes a yoke 1702, an attachment/detachment screw 1704 and a retaining cable loop 1706. Yoke 1702 has a top 1708 and a base 1710 attached to rear portion of AAV 1304. Attachment/detachment screw 1704 has a top 1712, a base 1714, a helical thread 1716 and corresponding helical groove 1718 and a hexagonal hole 1720. Yoke 1702 is spaced from attachment/detachment screw 1704 by a distance, $d_{ty}$, from thread 1716 to yoke 1702 and by a distance, $d_{gy}$, from groove 1718 to yoke 1702. Retaining cable loop 1706 is connected to securing cable 1606 (not shown) of FIG. 6.

Attachment/detachment screw 1704 may turn in either clockwise or counter clockwise direction. In some embodiments, attachment/detachment screw 1704 may be turned via a known hexagonally shaped wrench that is inserted into hexagonal hole 1720. In some embodiments, attachment/detachment screw 1704 may be turned via a known motorized driving mechanism (not shown).

To attach retaining cable loop to yoke 1702, retaining cable loop 1706 is looped over yoke 1702 so as to rest between attachment/detachment screw 1704 and yoke 1702. Attachment/detachment screw 1704 is turned in a clockwise direction as shown by circular arrow 1722.

When helical thread 1716 is disposed opposite from yoke 1702, the distance, $d_{ty}$, between helical thread 1716 and yoke 1706 is less than the thickness of retaining cable loop 1706. Thus retaining cable loop 1706 cannot fit between helical thread 1716 and yoke 1706.

However, as attachment/detachment screw 1704 continues to turn in a clockwise direction, helical groove 1718 will be disposed opposite from yoke 1702. At this point, the distance, $d_{gy}$, between helical groove 1718 and yoke 1706 is greater than the thickness of retaining cable loop 1706. Thus retaining cable loop 1706 fits between helical groove 1718 and yoke 1706.

As attachment/detachment screw 1704 continues to turn in a clockwise direction, helical groove 1716 will drive retaining cable loop 1706 in a direction toward base 1714 as indicated by arrow 1724. Further, helical thread 1716 will retain retaining cable loop 1706 in position.

Figure 17B:
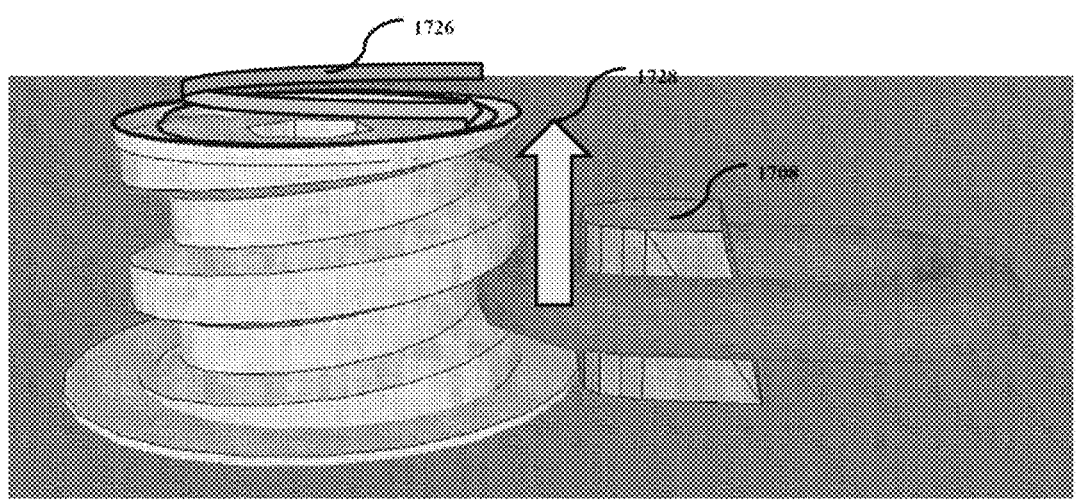
FIG. 17B illustrates the securing mechanism of FIG. 17A in a detached state.

FIG. 17B illustrates securing mechanism 1602 in a detached state.

To detach retaining cable loop to yoke 1702, attachment/detachment screw 1704 is turned in a counter-clockwise direction as shown by circular arrow 1726. Helical thread 1716 will drive retaining cable loop 1706 in a direction away from base 1714 as indicated by arrow 1728. Eventually, retaining cable loop 1706 will pass top 1708 of yoke 1702, wherein retaining cable loop 1706 will disconnect from hoke 1702, thus disconnecting securing cable 1606 from AAV 1304.

It should be noted that the non-limiting example embodiment of securing mechanism 1602 discussed above with reference to FIGS. 17A-B is provided merely for purposes of discussion, and that any known securing mechanism may be used in accordance with various embodiments of the present invention. In some embodiments, securing mechanism 1602 is manually controlled. In some embodiments, securing mechanism 1602 is motorized.

Further, in the event that connector boat 900 receives cataclysmic damage and is in imminent danger of sinking, AAV 1304 should be disconnected from securing cable 1606 so that AAV 1304 will not sink with connector boat 900. Therefore, in some embodiments, AAV 1304 may be remotely disconnected from securing cable 1606. In some embodiments, the detachment of securing cable 1606 from securing mechanism 1602 is motorized and is able to be controlled from within AAV 1304. In some embodiments, the detachment of securing cable 1606 from securing mechanism 1602 is motorized and is able to be controlled from within cabin 906 of connector boat 900. In some embodiments, the detachment of securing cable 1606 from securing mechanism 1602 is motorized and is able to be controlled from sloped vehicle deck 1008 of connector boat 900.

In accordance with an aspect of the present invention, in an example connector boat, an integrated electrical supply connection is provided for amphibious vehicles to enable powering of the vehicle loads while in transit thereby reducing fuel consumption of the vehicles (and therefore increasing their effective range). This will be described in greater detail with reference to FIG. 18.

Figure 18:
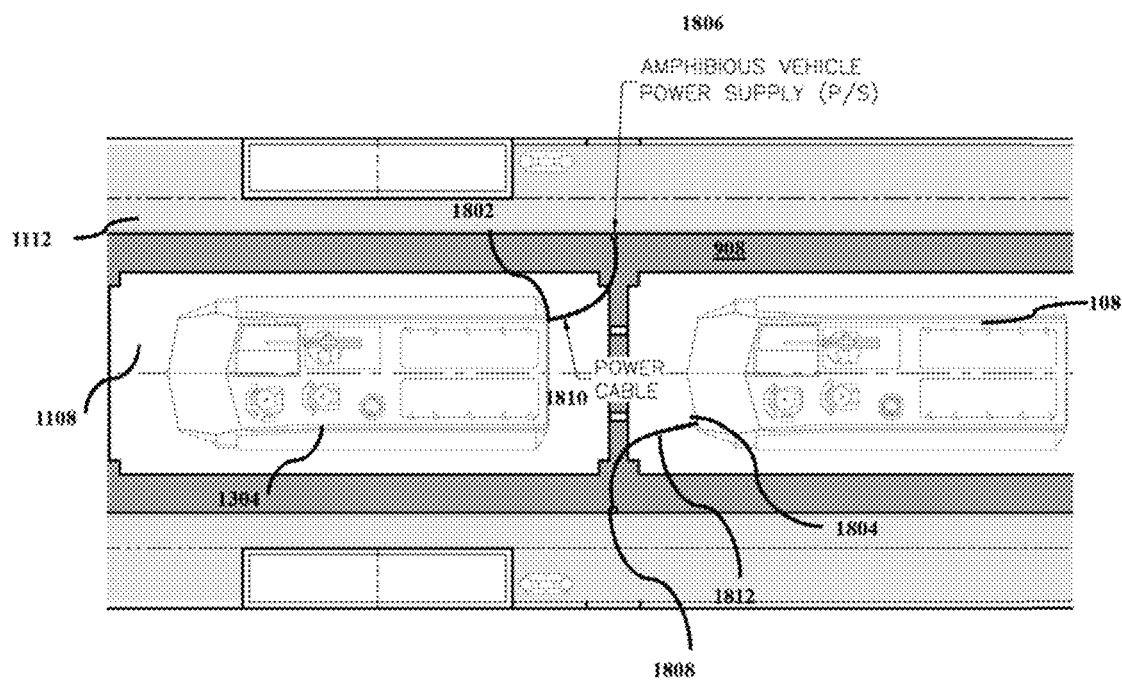
FIG. 18 illustrates an example power supply system for providing power to secured amphibious vehicles in the connector boat of FIG. 9.

FIG. 18 illustrates an example power supply system for providing power to secured amphibious vehicles in connector boat 900. FIG. 18 includes a top view of a portion of connector boat 900, wherein hold 908 is loaded with AAV 108 and AAV 1304.

Each of AAV 108 and AAV 1304 includes at least one power port thereon, samples of which are indicated as AAV rear power port 1802 located at the rear of AAV 1304 and AAV front power port 1804 located at the front of AAV 108. Connector boat 900 includes a plurality of power supplies, samples of which are indicated as power supply 1806 and power supply 1808. In this example embodiment, a power cable 1810 electrically connects AAV 1304 to power supply 1806, whereas a power cable 1812 electrically connects AAV 108 to power supply 1808.

In the event that connector boat 900 receives cataclysmic damage and is in imminent danger of sinking, AAV 1304 should be disconnected from power cable 1812 so that AAV 1304 will not sink with connector boat 900. Therefore, in some embodiments, AAV 1304 may be remotely disconnected from power cable 1812. In some embodiments, the detachment of power cable 1812 from AAV 1304 is motorized and is able to be controlled from within AAV 1304. In some embodiments, the detachment of power cable 1812 from AAV 1304 is motorized and is able to be controlled from within cabin 906 of connector boat 900. In some embodiments, the detachment of power cable 1812 from AAV 1304 is motorized and is able to be controlled from sloped vehicle deck 1008 of connector boat 900.

Returning to FIG. 7, after the landing vehicle is loaded onto the connector boat (S704), the FLO/FLO ship takes on water ballast (S706). This will be described in greater detail with reference to FIGS. 19-20.

Figure 19:
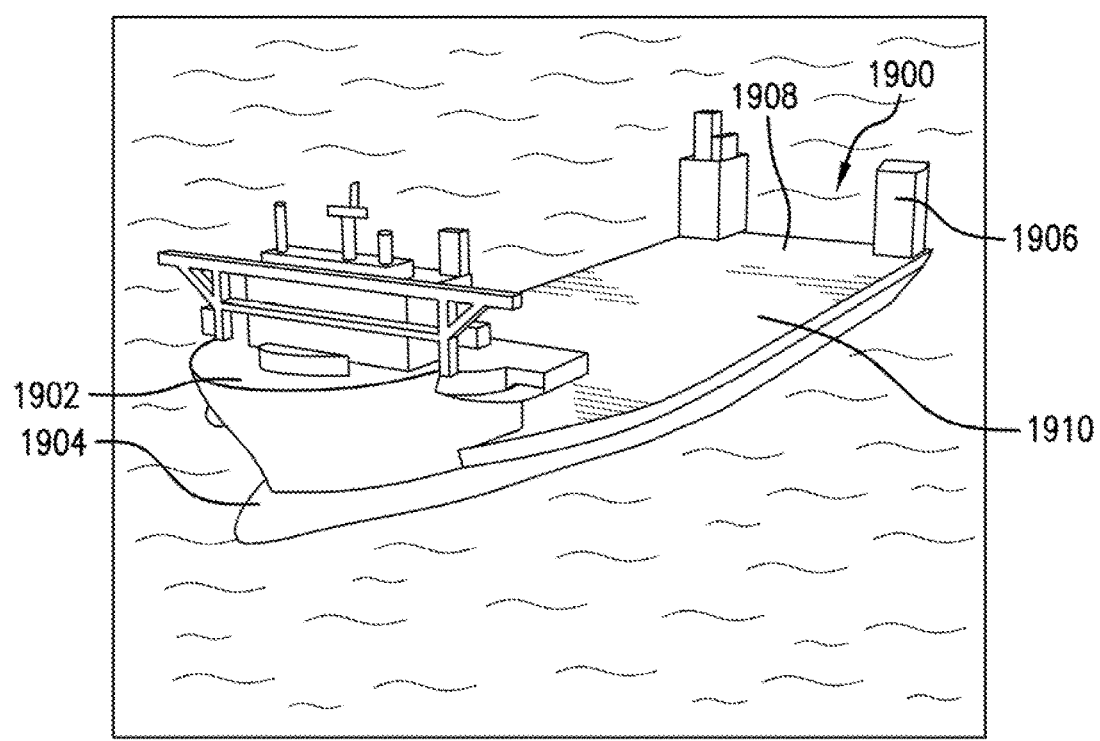
FIG. 19 illustrates an example conventional FLO/FLO ship.

FIG. 19 illustrates an example FLO/FLO ship 1900.

As shown in the figure, FLO/FLO ship 1900 includes a forward pilot house 1902 located at the bow 1904, aft machinery 1906 located at the stern 1908 and a well deck 1910 disposed between forward pilot house 1902 and aft machinery 1906.

Pilot house 1902 houses the main cabin for the captain and crew of FLO/FLO ship 1900. Aft machinery 1906 includes pumps for regulating water ballast for FLO/FLO-ship 1902. Well deck 1910 provides a surface to haul cargo.

In operation, when aft machinery 1906 pumps water to take on water ballast to lower FLO/FLO ship 1900 further below the water line. This will be described in greater detail with reference to FIG. 20.

Figure 20:
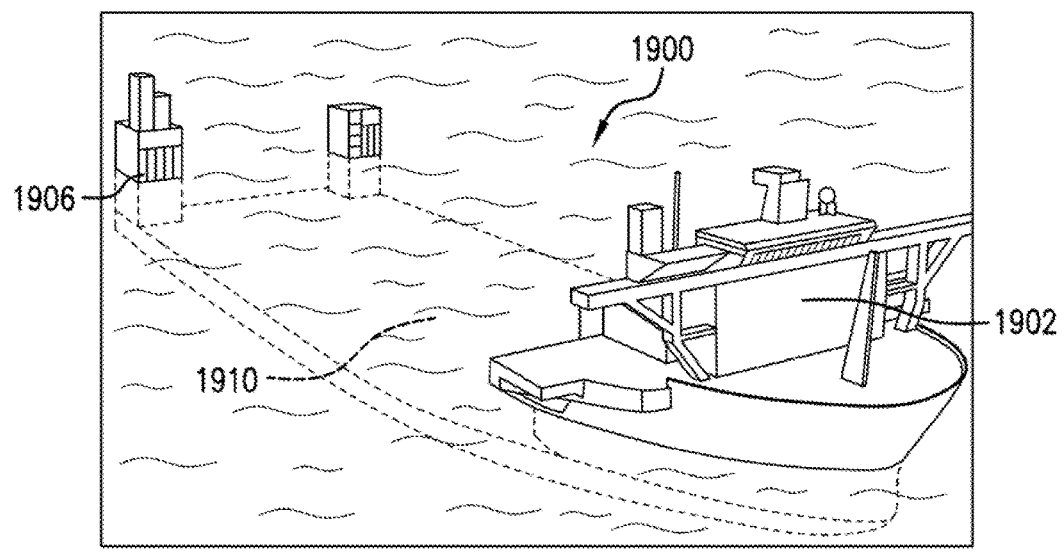
FIG. 20 illustrates the conventional FLO/FLO ship of FIG. 19 in a semi-submersed stage for loading boats.

FIG. 20 illustrates FLO/FLO ship 1900 in a semi-submersed stage for loading boats.

As shown in the figure, FLO/FLO ship 1900 has lowered such that well deck 1910 is below the water surface. At this point, smaller boats are able to flow onto well deck 1910 of FLO/FLO ship 1900.

Returning to FIG. 7, after the FLO/FLO ship takes on water ballast (S706), the loaded connector boat is floated onto the FLO/FLO ship (S708).

For example, connector boat 900 may be loaded with AAV 108 and AAV 1304 as discussed above with reference to FIG. 13. Further, in an example embodiment, 15 additional connector boats may be loaded with some combination of CRRCs, AAVs and LCM6s. In this manner, 16 loaded connector boats may quickly and efficiently floated onto a single FLO/FLO ship.

Returning to FIG. 7, after the loaded connector boat is floated onto the FLO/FLO ship (S708), the water ballast is jettisoned from the FLO/FLO ship (S710). This will be described in greater detail with reference to FIGS. 21-22.

Figure 21:
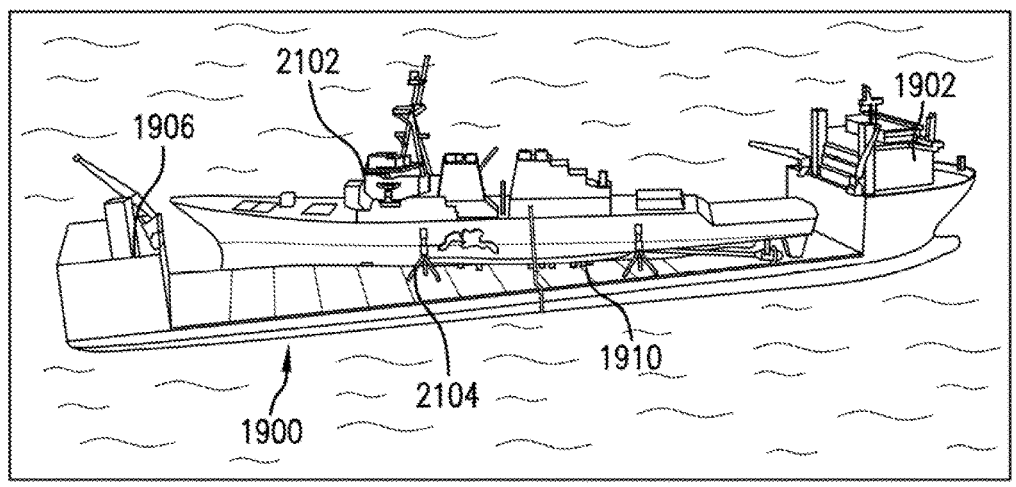
FIG. 21 illustrates the conventional FLO/FLO ship of FIG. 19 with a boat loaded thereon.
Figure 22:
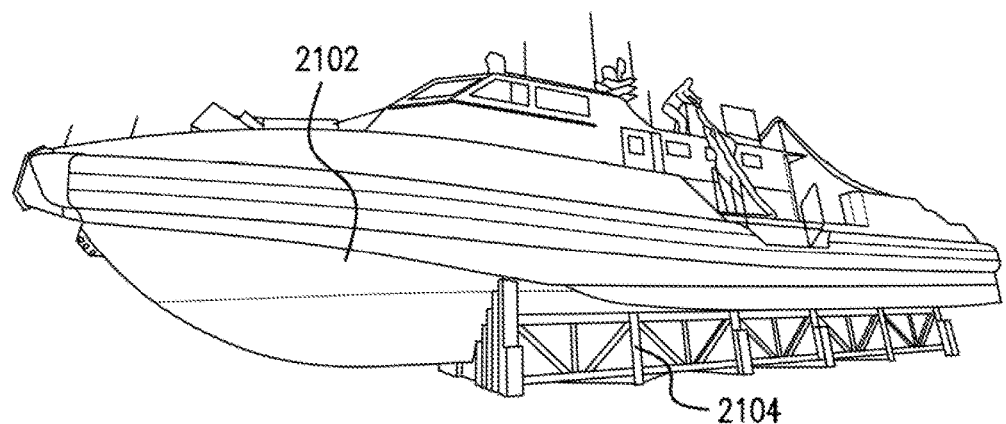
FIG. 22 illustrates a boat supported on an example dry dock support structure for holding for transport on a FLO/FLO ship.

FIG. 21 illustrates FLO/FLO ship 1900 with a boat 2102 loaded thereon. FIG. 21 provides an image of a conventional use of FLO/FLO ship 1900. In the figure, boat 2102 is supported on a dry dock support structure 2104 on well deck 1910. FIG. 22 illustrates an exploded view of boat 2102 supported on dry dock support structure 2204 for holding for transport on FLO/FLO ship 1900.

In accordance with various embodiments of the present invention, FLO/FLO ship 1900 may include a plurality of dry dock support structures in order to haul a plurality of connector boats. This will be shown in more detail with reference to FIGS. 23-24.

Figure 23:
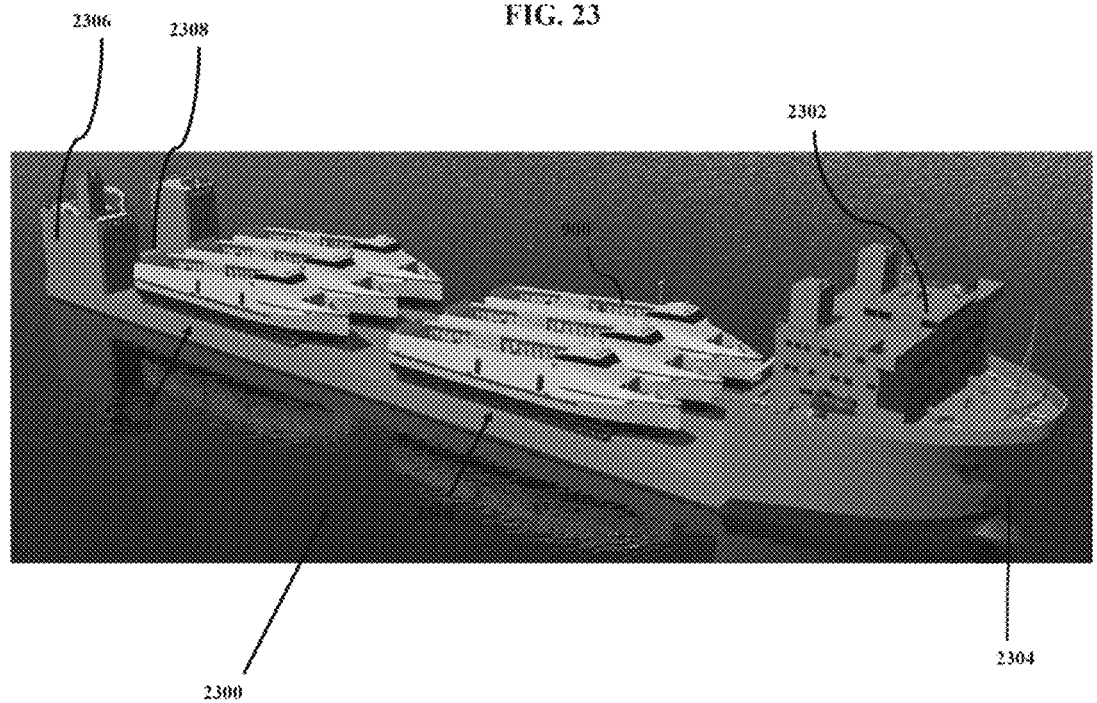
FIG. 23 illustrates a FLO/FLO ship carrying six connector boats in accordance with various embodiments of the present invention.

FIG. 23 illustrates FLO/FLO ship 2300 carrying six connector boats in accordance with various embodiments of the present invention.

As shown in the figure, FLO/FLO ship 2300 includes a forward pilot house 2302 located at the bow 2304, aft machinery 2306 located at the stern 2308 and a well deck 2310 disposed between forward pilot house 2302 and aft machinery 2306. In this figure, FLO/FLO ship 2300 is carrying two rows of three connector boats, including connector boat 900. In this example implementation, each dry dock support structure is arranged such that a connector boat for which it supports is aligned with the bow-to-stern axis of FLO/FLO ship 2300. A larger FLO/FLO ship may be configured to haul more connector boats. This will be described with references to FIG. 24-32.

Figure 24:
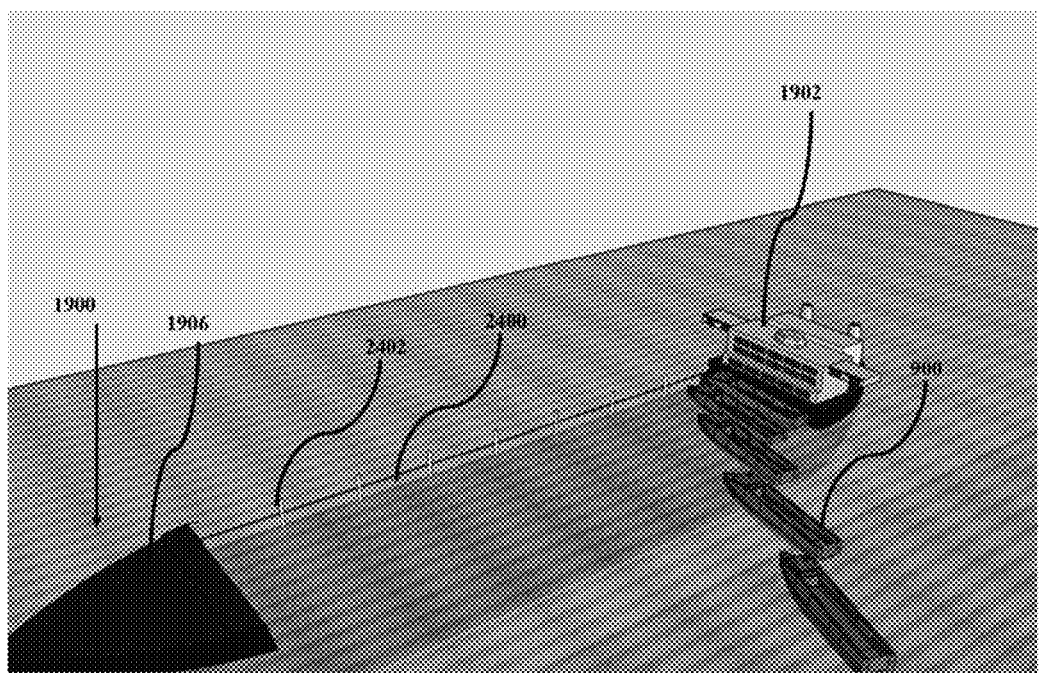
FIG. 24 illustrates one example method of a plurality of connector boats floating onto a partially submerged FLO-FLO ship.

FIG. 24 illustrates one example method of a plurality of connector boats floating onto partially submerged FLO/FLO ship 1900.

In this example embodiment, the starboard side of FLO/FLO ship 1900 further includes a lateral alignment cable 2400 supported through a plurality of deployable posts, a sample of which includes deployable post 2402. In this example embodiment, lateral alignment cable 2400 is connected at one end to aft machinery 1906 and at the other end to forward pilot house 1902.

Lateral alignment cable 2400 provides a simple, flexible, yielding barrier used to limit the distance a connector boat may float when floating onto FLO/FLO ship 1900. This prevents connector boats from over-shooting well deck 1910 and greatly reduces the time, effort and precision needed to align a connector boat with the collapsible dry dock support structures on well deck 1910.

In some embodiments, lateral alignment cable 2400 is only connected at one end to aft machinery 1906 and at the other end to forward pilot house 1902, without the use of a plurality of deployable posts. However, in such an arrangement, lateral alignment cable 2400 would take the shape of a catenary. The valley of the catenary may be too low to prevent some connector boats from over-shooting the well deck 1910. Accordingly, a plurality of posts drastically reduces the size of the valley of a catenary within any portion of alignment cable 2400.

The port side of FLO/FLO ship 1900 may also include a corresponding lateral alignment cable and plurality of deployable posts (not shown). As such, FLO/FLO ship 1900 may be configures to accept connector boats from either side. In the case of FIG. 24, the starboard side's alignment cable and plurality of deployable posts are deployed, whereas the port side's alignment cable and plurality of deployable posts are lowered thus enabling connector boats to flow onto FLO/FLO ship 1900 from the port side.

The non-limiting example embodiment discussed above with reference to FIG. 24 addressed a system and method to prevent over-shoot by connector boat flowing onto well deck 1910. However, there may also be an issue related to quickly and efficiently aligning the connector boats with respective collapsible dry dock support structures on well deck 1910. This will be addressed with reference to FIG. 25.

Figure 25:
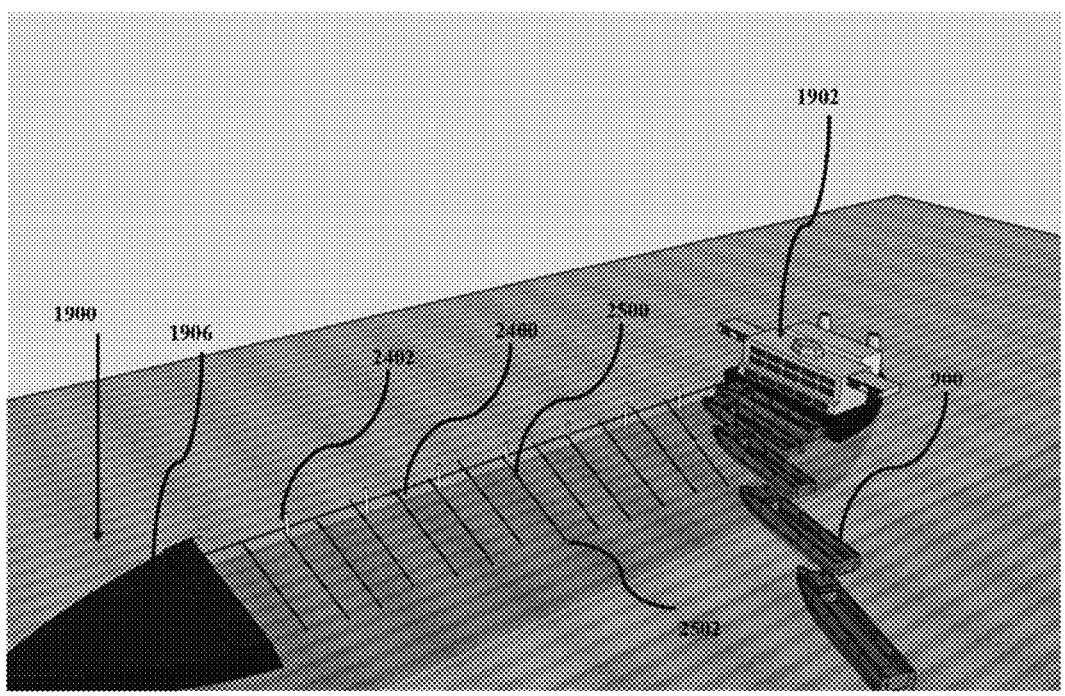
FIG. 25 illustrates another example method of a plurality of connector boats floating onto a partially submerged FLO/FLO ship.

FIG. 25 illustrates another example method of a plurality of connector boats floating onto partially submerged FLO/FLO ship 1900.

In this example embodiment, FLO/FLO ship 1900 further includes a plurality of longitudinal alignment cables, a sample of which includes longitudinal alignment cable 2500, supported by a corresponding plurality of deployable posts, a sample of which includes deployable post 2502.

In this non-limiting example embodiment, lateral alignment cable 2400 again prevents connector boats from overshooting well deck 1910. However, each longitudinal alignment cable provides a simple, flexible, yielding barrier used to create a type of "parking space" for a connector boat when floating onto FLO/FLO ship 1900. This aids in aligning connector boats in parallel with their respective collapsible dry dock support structures on well deck 1910.

It should be noted that alignment cables are not required, but are merely optional novel aspects of a FLO/FLO ship in accordance with various embodiments of the present invention.

As mentioned above, a FLO/FLO ship in accordance with the present invention may use dry dock support structures to hold connector boats when transporting them. In some embodiments, such dry dock support structures may be collapsible into the well deck. This will be described with additional reference to FIGS. 26-31.

Figure 26:
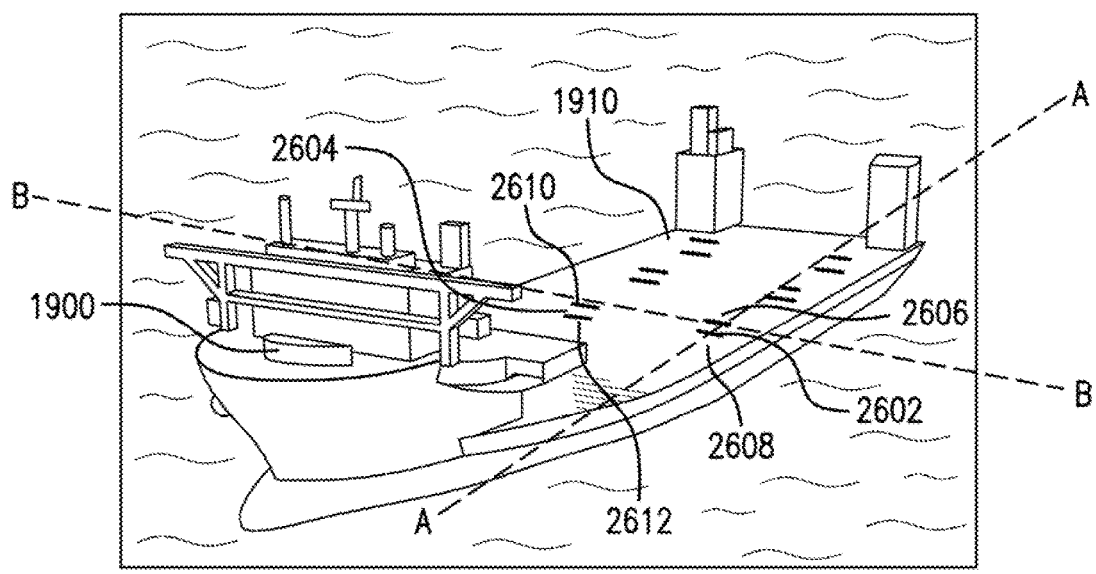
FIG. 26 illustrates an example FLO/FLO ship having a plurality of collapsible dry dock support structures disposed within its well deck in accordance with various embodiments of the present invention.

FIG. 26 illustrates FLO/FLO ship 1900 having a plurality of collapsible dry dock support structures disposed within well deck 1910 in accordance with various embodiments of the present invention.

As shown in the figure, the collapsible dry dock support structures are arranged in groups of pairs, a sample of which includes a group having pair 2602 and pair 2604. Pair 2602 includes collapsible dry dock support structure 2606 and collapsible dry dock support structure 2608. Pair 2604 includes collapsible dry dock support structure 2610 and collapsible dry dock support structure 2612.

Collapsible dry dock support structure 2606 is arranged to compliment collapsible dry dock support structure 2608 when they are both deployed in order to hold a portion of a connector boat. Similarly, collapsible dry dock support structure 2610 is arranged to compliment collapsible dry dock support structure 2612 when they are both deployed in order to hold another portion of a connector boat.

By having the dry dock support structures collapsible into the well deck, a FLO/FLO ship in accordance with various embodiments of the present invention may be more versatile in a littoral battle space. Specifically, when deployed, the dry dock support structures may be used to carry a plurality of connector boats to the littoral battle space. Once the connector boats have been launched off the FLO/FLO ship, the dry dock support structures may be collapsed into the well deck of the FLO/FLO ship, thus providing a large smooth surface on the well deck. In this manner, the FLO/FLO ship may be used to ferry other larger fleet ships, which may be damaged in the littoral battle space, away from the littoral battle space for example as shown in FIG. 21.

A non-limiting example of, and use of, collapsible dry dock support structures will now be further described with additional reference to FIGS. 27-31.

Figure 27:
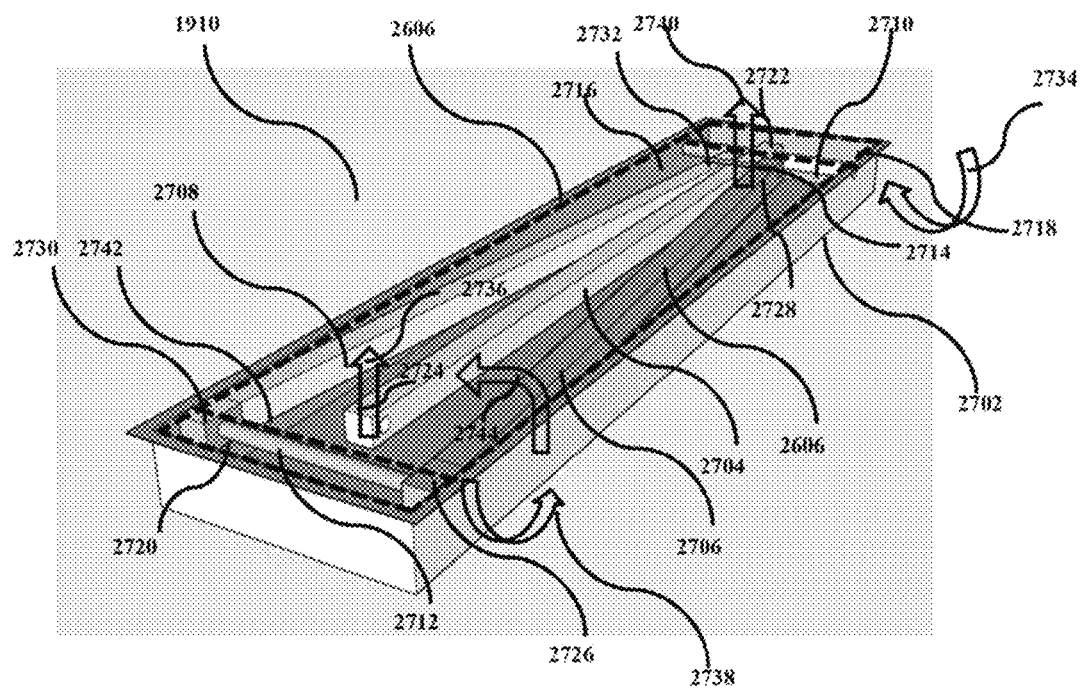
FIG. 27 illustrates an example collapsible dry dock support structure in accordance with various embodiments of the present invention.

FIG. 27 illustrates an example of collapsible dry dock support structure 2606 in a collapsed position in accordance with various embodiments of the present invention.

As shown in the figure, collapsible dry dock support structure 2606 includes a housing 2702, a central leg 2704, a side leg 2706, a side leg 2708, a central leg pivot axle 2710, a side leg pivot axle 2712, a restraining bar 2714, a support plate 2716, a cover plate 2718 and a cover plate 2720. Central leg 2704 has a pivot end 2722 and a moving end 2724. Side leg 2706 has a pivot end 2726 and a moving end 2728. Side leg 2708 has a pivot end 2730 and a moving end 2732.

Central leg pivot axle 2710 is attached to pivot end 2722 of central leg 2704 and is rotatably anchored to two parallel inner sides of housing 2702, such that central leg pivot axle 2710 may rotate about its axis as indicated by curved arrow 2734. Rotation of central leg pivot axle 2710 in such a manner will rotate central leg 2704 such that moving end 2724 will rotate upward as indicated by arrow 2736.

Central leg 2704 is disposed between side leg 2706 and side leg 2708 such that moving end 2724 of central leg 2704 is centrally disposed near pivot end 2726 of side leg 2606 and pivot end 2730 of side leg 2608 and such that pivot end 2722 of central let 2704 is centrally disposed near moving end 2728 of side leg 2606 and pivot end 2732 of side leg 2608. Restraining bar 2714 connects moving end 2728 of side leg 2706 with moving end 2732 of side leg 2708. Restraining bar 2714 is disposed over central leg 2704.

Side leg pivot axle 2712 is attached to pivot end 2726 of side leg 2706, is rotatably anchored to an inner side of housing 2702, is attached to pivot end 2730 of side leg 2708, and is rotatably anchored to an inner side of housing 2702 such that side leg pivot axle 2712 may rotate about its axis as indicated by curved arrow 2738. Rotation of side leg pivot axle 2712 in such a manner will side leg 2706 and side leg 2708 such that moving end 2718 and moving end 2724 will rotate upward as indicated by arrow 2740. Restraining bar 2714 ensures that moving end 2728 of side leg 2706 rotates upward at the same rate as moving end 2732 of side leg 2708. Restraining bar 2714 additionally prevents moving end 2728 of side leg 2706 and moving end 2732 of side leg 2708 from falling down when moving end 2724 of central leg 2704 rotates upward.

Cover plate 2718 is arranged to cover a portion of housing 2702 near pivot end 2722 of central leg 2704. Cover plate 2720 is arranged to cover a portion of housing 2702 near pivot end 2726 of side leg 2726. Support plate 2716 is disposed between cover plate 2718 and cover plate 2720 to cover the remainder of housing 2702. In some embodiments, an end 2742 of support plate 2716 is rotatably attached to cover plate 2720, so as to be able to rotate in a manner indicated by arrow 2744.

Figure 28:
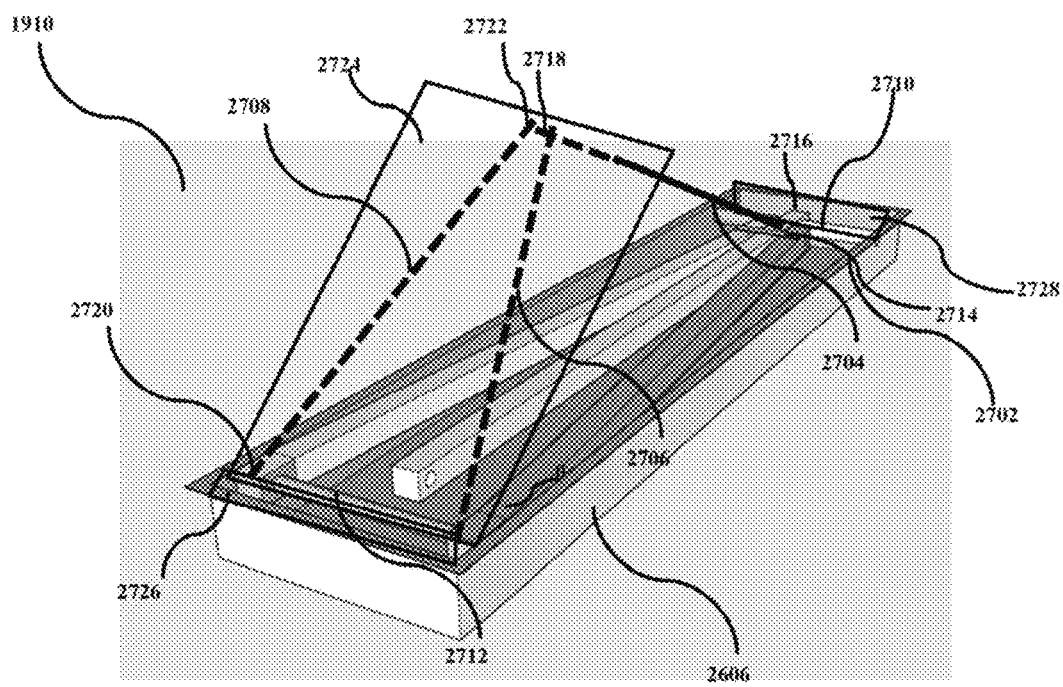
FIG. 28 illustrates the collapsible dry dock support structure of FIG. 27 in an expanded position.

FIG. 28 illustrates collapsible dry dock support structure 2606 in an expanded position. As shown in the figure, central leg 2704 has been rotated upward such that moving end 2724 has moved away from well deck 1910. Similarly, side leg 2706 and side leg 2708 have been rotated upward such that moving end 2728 of side leg 2706 and moving end 2732 of side leg 2708 have moved away from well deck 1910.

As moving end 2728 of side leg 2706 and moving end 2732 of side leg 2708 move away from well deck 1910, support plate 2716 rotates about end 2742 such that support plate 2716 makes an angle θ with respect to well deck 1910.

Central leg pivot axle 2710 and side leg pivot axle 2712 may be rotated by any known system or method to deploy collapsible dry dock support structure 2606. Non-limiting examples of known systems or method to rotate central leg pivot axle 2710 and side leg pivot axle 2712 include electrical, mechanical and hydraulic systems.

When deployed, a pair of complimentary collapsible dry dock support structures holds and supports a connector boat when the hull of the connector boat rests therebetween. This will be described with reference to FIGS. 29-30.

Figure 29:
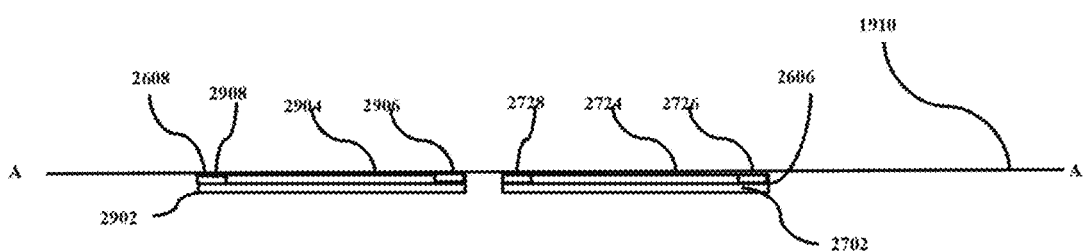
FIG. 29 illustrates a cross-sectional view of the well deck and two collapsible dry dock support structures of the FLO/FLO ship of FIG. 26 as viewed along line A-A, wherein the dry dock collapsible dry dock support structures are in a collapsed position.

FIG. 29 illustrates a cross-sectional view of well deck 1910 having collapsible dry dock support structure 2606 and collapsible dry dock support structure 2608 of FLO/FLO ship 1900 as viewed along line A-A, wherein collapsible dry dock support structure 2606 and collapsible dry dock support structure 2608 are in a collapsed position.

As shown in the figure, collapsible dry dock support structure 2608 includes a structure similar to collapsible dry dock support structure 2606 discussed above with reference to FIG. 27, a sample of which is indicated as includes a housing 2902, a support plate 2904, a cover plate 2908 and a cover plate 2906.

Figure 30:
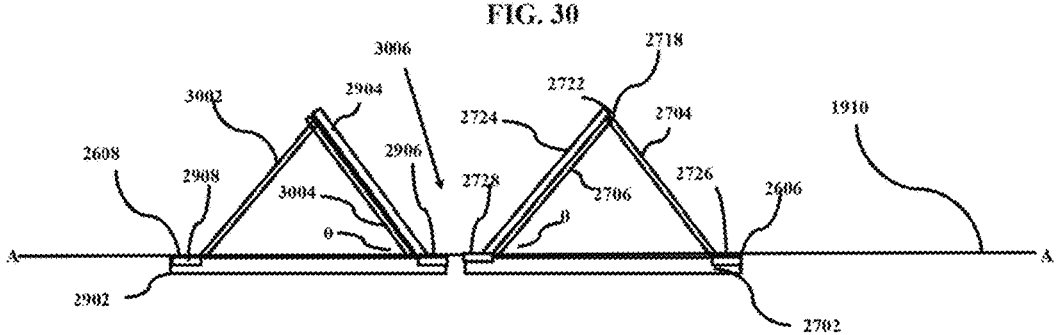
FIG. 30 illustrates the cross-sectional view of the well deck and two collapsible dry dock support structures of the FLO/FLO ship of FIG. 26 as viewed along line A-A, wherein the dry dock collapsible dry dock support structures are in an expanded position.

FIG. 30 illustrates a cross-sectional view of well deck 1910 having collapsible dry dock support structure 2606 and collapsible dry dock support structure 2608 of FLO/FLO ship 1900 as viewed along line A-A, wherein collapsible dry dock support structure 2606 and collapsible dry dock support structure 2608 are in an expanded position.

As shown in the figure, collapsible dry dock support structure 2608 additionally includes a central leg 3002 and a side leg 3004.

When deployed in an expanded position, support plate 2904 of collapsible dry dock support structure 2608 makes an angle θ with reference to well deck 1910. Accordingly, support plat 2904 and support plate 2724 of collapsible dry dock support structure 2606 provide a space 3006 for which the hull of a connector boat may rest for transport on FLO/FLO ship 1900.

In some embodiments, a single pair of complimentary collapsible dry dock support structures may be used to hold a connector boat by holding complimentary sides of the connector boat's hull. However, in other embodiments, multiple pairs of complimentary collapsible dry dock support structures may be used to hold a connector boat by holding complimentary sides of the connector boat's hull. For example, in the example embodiment discussed above with reference to FIG. 26, two pairs of complimentary collapsible dry dock support structures may are used. This will be described in detail with additional reference to FIG. 31.

Figure 31:
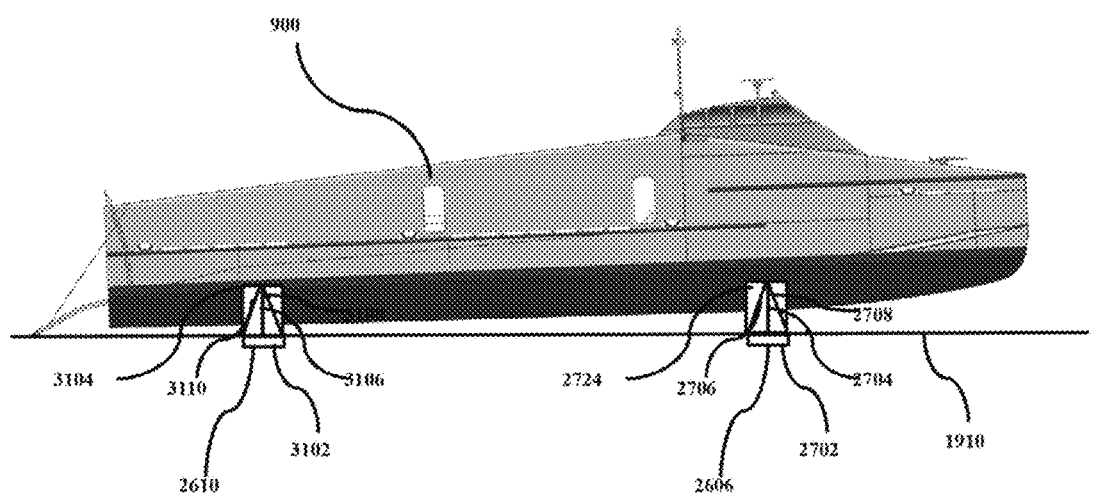
FIG. 31 illustrates the cross-sectional view of the well deck and two collapsible dry dock support structures of the FLO/FLO ship of FIG. 26 as viewed along line B-B, wherein the dry dock collapsible dry dock support structures are in an expanded position and are supporting a connector boat.

FIG. 31 illustrates a cross-sectional view of well deck 1910 having collapsible dry dock support structure 2606 and collapsible dry dock support structure 2608 of FLO/FLO ship 1900 as viewed along line B-B, wherein collapsible dry dock support structure 2606 and collapsible dry dock support structure 2610 are in an expanded position.

As shown in the figure, collapsible dry dock support structure 2610 includes a structure similar to collapsible dry dock support structure 2606 discussed above with reference to FIG. 27, a sample of which is indicated as includes a housing 3102, a support plate 3104, a central leg 3106, a side leg 3108 and a side leg 3110.

It should be noted that differently sized FLO/FLO ships may be used in accordance with various embodiments of the present invention. In particular, as the well deck length increases, the number of connector boats that may be carried additionally increases. In the non-limiting example provided herein, for example with reference to FIG. 19, sixteen connector boats may be carried.

Figure 32:
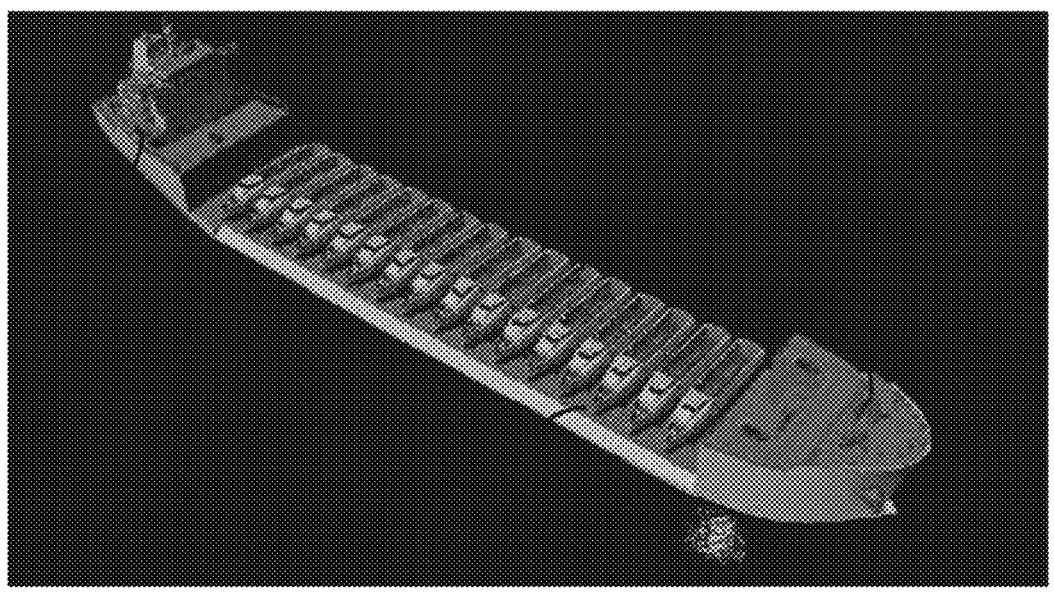
FIG. 32 illustrates another FLO/FLO ship carrying sixteen connector boats in accordance with various embodiments of the present invention.

FIG. 32 illustrates FLO/FLO ship 1900 carrying sixteen connector boats in accordance with various embodiments of the present invention. In this figure, FLO/FLO ship 1900 is carrying a single row of 16 connector boats, including connector boat 900. In this example implementation, each dry dock support structure is arranged such that a connector boat for which it supports is perpendicular with the bow-to-stern axis of FLO/FLO ship 1900.

Returning to FIG. 7, after the water ballast is jettisoned from the FLO/FLO ship (S710), the loaded FLO/FLO ship transports to a primary deployment location (S712). For example, returning to FIG. 8, after all the connector boats are loaded with their prescribed amphibious landing vehicles, and are loaded onto a FLO/FLO ship at staging site 802, the loaded FLO/FLO ship may travel to primary deployment location 804.

As the trip from staging site 802 to primary deployment location 804 may take days, the personnel for all the amphibious vehicles loaded onto all the connector boats and the crew members for all the connector boats may stay in another ship of the fleet. When the fleet is close to the primary deployment location, the personnel may then be transferred to the FLO/FLO ship and scramble to their respective connector boats for launch.

Returning to FIG. 7, after the loaded FLO/FLO ship transports to a primary deployment location (S712), the FLO/FLO ship again takes on water ballast (S714). For example, returning to FIG. 8, once the FLO/FLO ship reaches the primary deployment location 804, the connector boats need to be launched. This will be described in greater detail with additional reference to FIG. 33.

Figure 33:
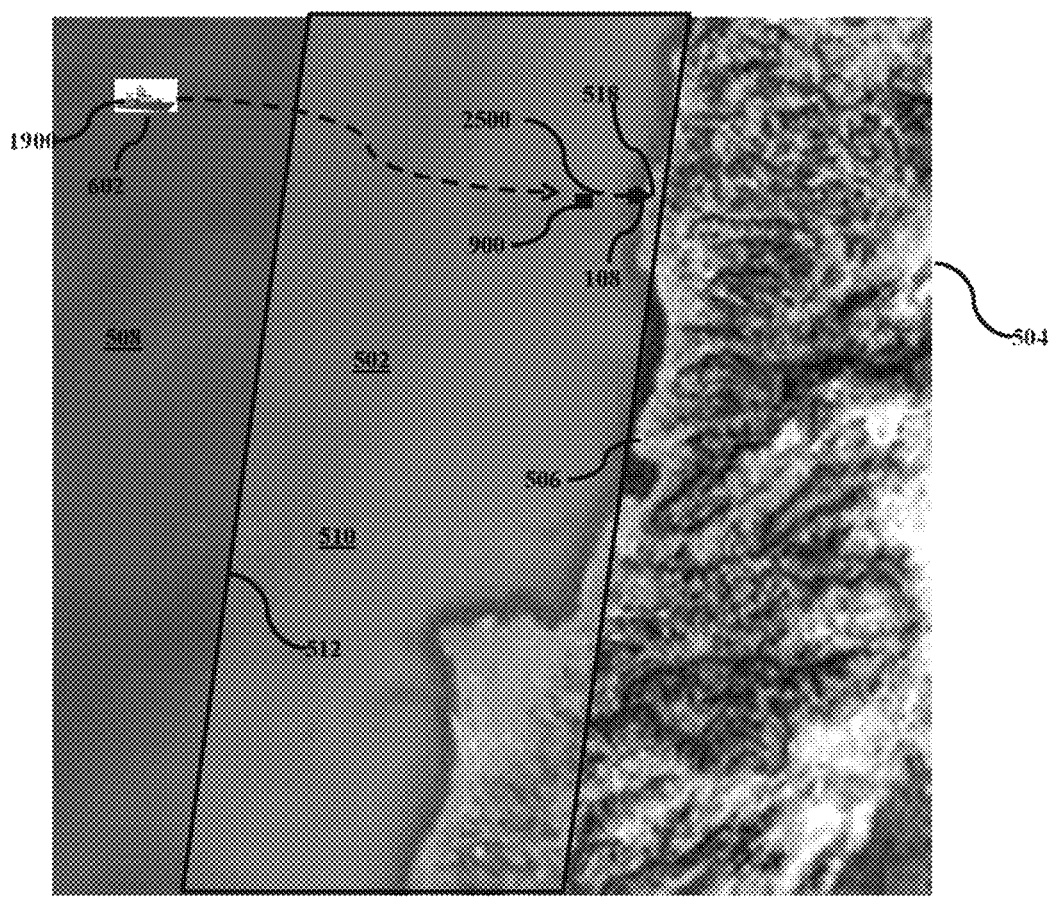
FIG. 33 illustrates an amphibious assault in a littoral battlespace from a primary deployment location in accordance with various embodiments of the present invention.

FIG. 33 illustrates an amphibious assault in a littoral battlespace from a primary deployment location in accordance with various embodiments of the present invention. FIG. 33 includes body of water 502, land 504, FLO/FLO ship 1900, connector boat 900 and AAV 108. In FIG. 33, a staging site is not shown (as the scale of the figure will not permit). However, primary deployment location 804 of FIG. 8 may correspond to position 602 of FIG. 33, whereas secondary deployment location 806 may correspond to position 2500.

In this example, FLO/FLO ship 1900 is located at position 602 within out-of-range area 508. As such, FLO/FLO ship 1900 is OTH and has a decreased chance of taking damage from land-based rockets. In accordance with various embodiments of the present invention, position 602 is a primary deployment location, as this is the location where FLO/FLO ship 1900 deploys connector boat 900.

Returning to FIG. 7, after the FLO/FLO ship again takes on water ballast (S714), the loaded connector boat is floated off the FLO/FLO ship (S716). Deployment of connector boats from FLO/FLO ship 1900 will be described with greater detail in reference to FIGS. 26-28.

Figure 34:
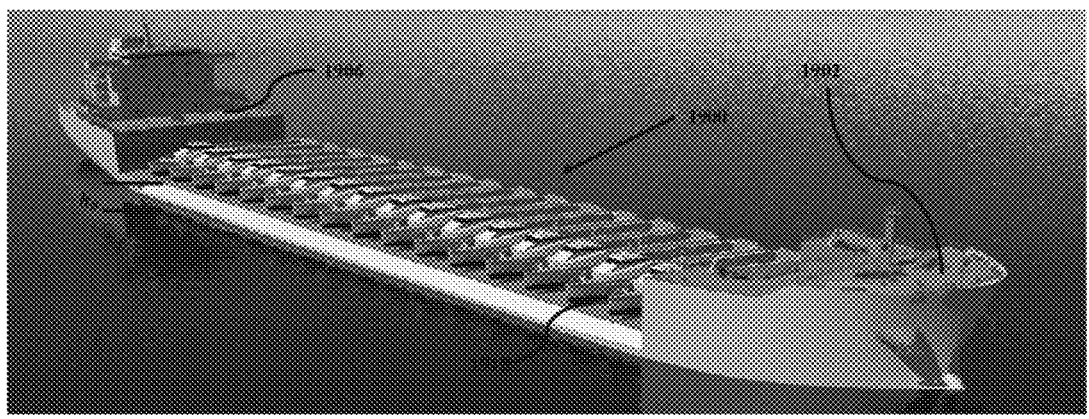
FIG. 34 illustrates the FLO/FLO ship carrying sixteen connector boats of FIG. 32 at time $t_0$ at a primary deployment location.

FIG. 34 illustrates FLO/FLO ship 1900 carrying sixteen connector boats, a sample of which includes connector boat 900, at time $t_0$ at primary deployment location 602.

As shown in the figure, well deck 1910 of FLO/FLO ship 1900 is a height $h_0$ above the water line. Aft machinery 1906 pumps water to take on water ballast to lower FLO/FLO ship 1900.

Figure 35:
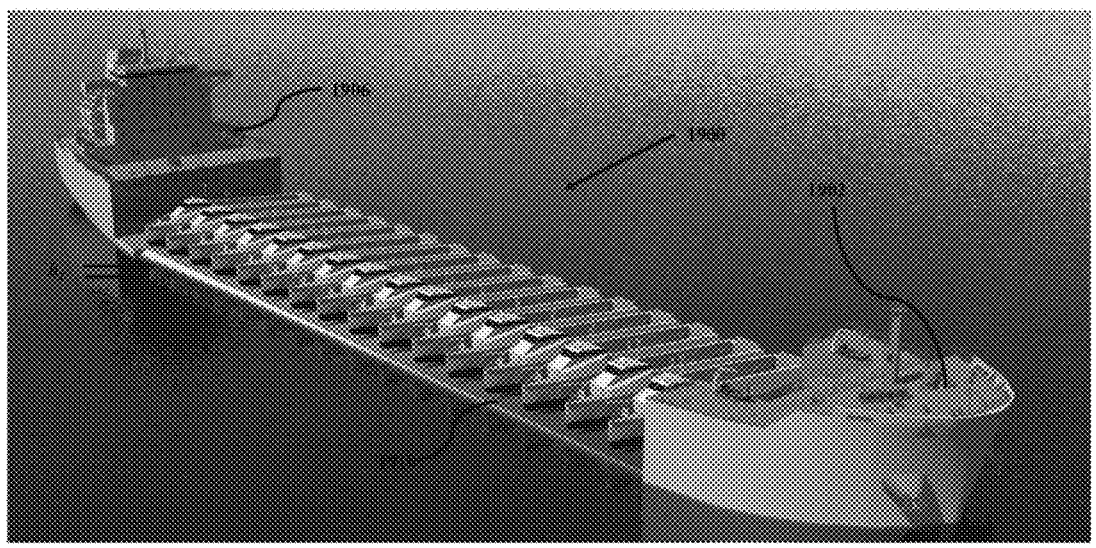
FIG. 35 illustrates the FLO/FLO ship carrying sixteen connector boats of FIG. 32 at time $t_1$ at the primary deployment location.

FIG. 35 illustrates FLO/FLO ship 1900 carrying sixteen connector boats, a sample of which includes connector boat 900, at time $t_1$ at primary deployment location 602. At time $t_1$, aft machinery 1906 has pumped sufficient water to lower FLO/FLO ship 1900 such that well deck 1910 is a height $h_1$ above the water line. It is clear from a comparison with height $h_0$ of FIG. 34 that well deck 1910 is much closer to the water line at height $h_1$.

Figure 36:
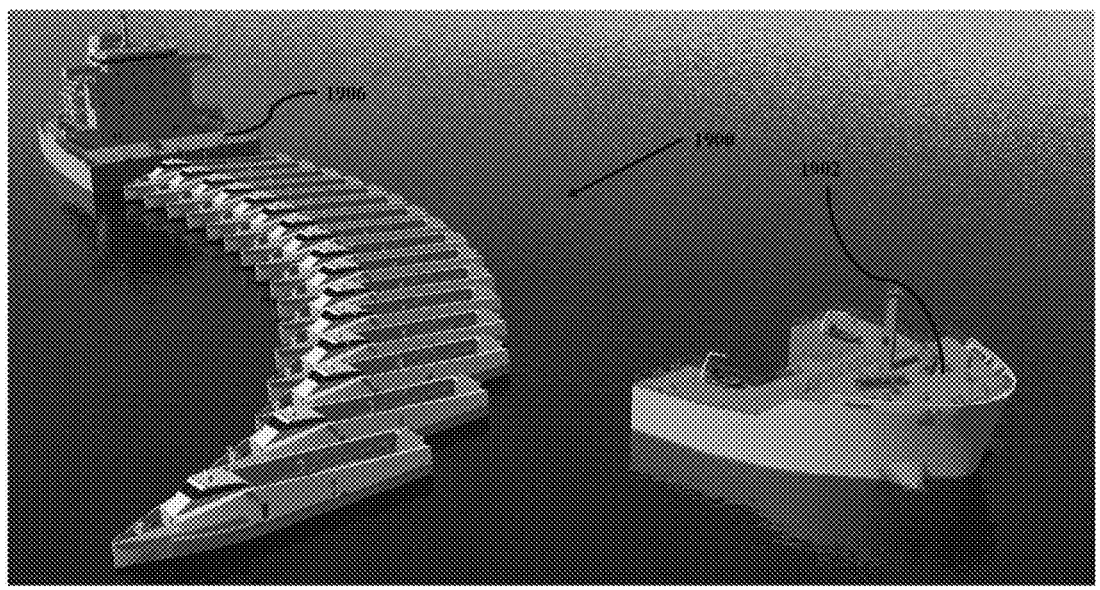
FIG. 36 illustrates the FLO/FLO ship carrying sixteen connector boats of FIG. 32 at time $t_2$ at the primary deployment location.

FIG. 36 illustrates FLO/FLO ship 1900 carrying sixteen connector boats, a sample of which includes connector boat 900, at time $t_2$ at primary deployment location 602. At time $t_2$, aft machinery 1906 has pumped sufficient water to lower FLO/FLO ship 1900 such that well deck 1910 below the water line. Because well deck 1910 is below the water line, the plurality of connector boats float off their respective dry dock support structures (not shown) and launch toward secondary deployment location 2500.

Figure 37:
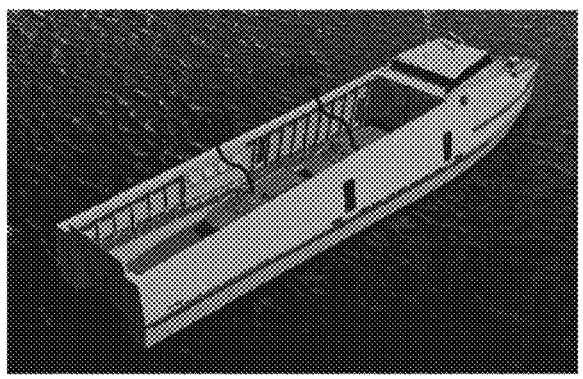
FIG. 37 illustrates the connector boat of FIG. 9 transporting two amphibious combat vehicles to a secondary deployment location.

Returning to FIG. 7, after the loaded connector boat is floated off the FLO/FLO ship (S716), the loaded connector boat is transported toward the coast to a secondary deployment location (S718). For example, FIG. 37 illustrates connector boat 900 transporting AAV 1304 and AAV 108 to a secondary deployment location.

Figure 38:
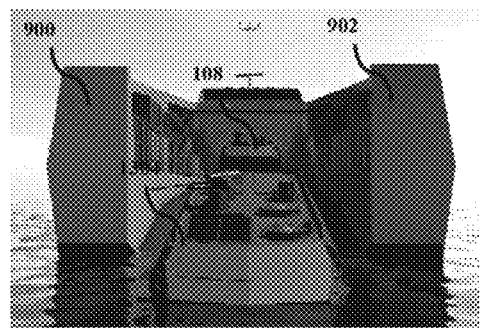
FIG. 38 illustrates the connector boat of FIG. 37 deploying the two amphibious combat vehicles at the secondary deployment location.
Figure 39:
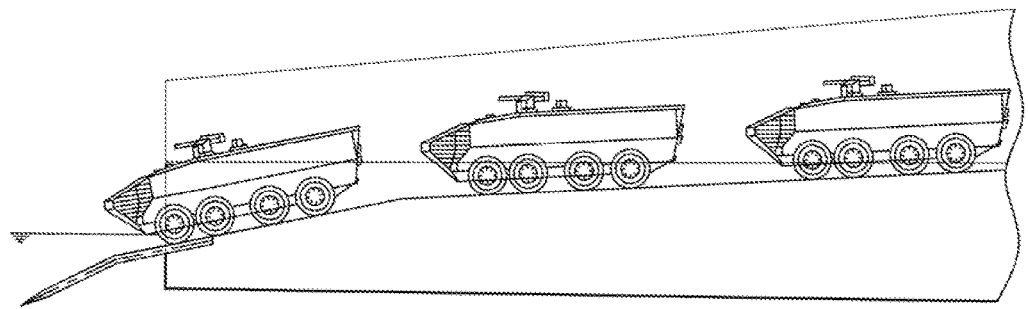
FIG. 39 amphibious combat vehicles exiting a stern ramp of the connector boat of FIG. 9.

Returning to FIG. 7, after the loaded connector boat is transported toward the coast to a secondary deployment location (S718), the amphibious vehicles are unloaded off the connector boat at the secondary deployment location (S720). FIG. 38 illustrates connector boat 900 deploying the two amphibious combat vehicles at the secondary deployment location. As shown in the figure, the stern ramp (not shown) of connector boat 900 drops below the water's surface. AAV 1304 drives down the sloped deck of connector boat 900, over the downed stern ramp (not shown) and into the sea. FIG. 39 provides a side view of AAVs exiting off stern ramp 910 of connector boat 900.

Figure 40:
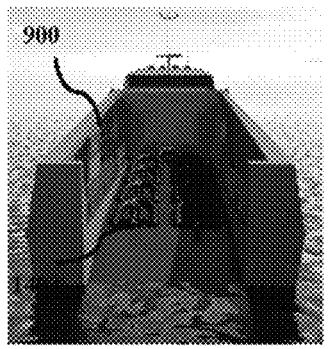
FIG. 40 illustrates another connector boat positioned to deploy the eight combat rubber reconnaissance craft.

It should be noted that other amphibious vehicles may be deployed via the stern ramp of connector boat 900 as discussed above. For example, FIG. 40 illustrates connector boat 900 positioned to deploy the eight CRRCs, a sample of which is indicated as CRRC 1402.

Returning to FIG. 7, after the amphibious vehicles are unloaded off the connector boat at the secondary deployment location (S720), the amphibious vehicles transport to the landing site on the beach (S722).

Returning to FIG. 33, for purposes of discussion, let the mission of warship 102 still specify an amphibious landing by AAV 108 at landing site 518 of coast 506. In this example, connector boat 900 deploys AAV 108 at position 2500. In accordance with various embodiments of the present invention, position 2500 is a secondary deployment location, which is within in-range area 510. In this example position 2500 is much closer to landing site 518 as compared with the conventional deployment location 514 discussed above with reference to FIG. 5.

As mentioned above, connector boat 900 has an operation range of 300-500 miles. Further, as mentioned above, connector boat 900 has a maximum fully loaded speed of 32 mph. For purposes of discussion, in this example, let position 2500 be 8 miles from landing site 518, and let position 2500 be 120 miles from position 620. Fully loaded connector boat 900 may then travel from FLO/FLO ship 1900 at position 602 to position 2500 in approximately 4 hours.

As mentioned previously, for this 4-hour trip, the personnel for the amphibious vehicles loaded in connector boat 900 may comfortably reside in lower deck 1302, as shown in FIG. 13. Upon reaching position 2500, or prior to it, the personnel may scramble from lower deck 1302 for their respective amphibious vehicle located on sloped deck 1008 of connector boat 900.

There more be situations where the personnel may need to scramble to their respective amphibious vehicles on sloped deck 1008 a relatively long time prior to reaching position 2500. For example in situations where the fleet of connector boats is taking enemy fire before reaching position 2500. In such cases, it might be beneficial to be ready to quickly disconnect the amphibious vehicles in the even connector boat 900 is catastrophically hit and begins to sink. As mentioned previously with reference to FIGS. 16-17B, in such a situation, the manned amphibious vehicle may be quickly disconnected from connector boat 900.

Still further, in the event that the personnel may need to scramble to their respective amphibious vehicles within hold 908 a relatively long time prior to reaching position 2500, in hot climates, the air inside the amphibious vehicle may become unbearably hot. Running climate controls on an AAV may use a costly amount of fuel that may be desperately needed for the landing mission, especially for hours if needed to reach secondary deployment location at position 2500. To relieve such resource stress on the AAV, power may be supplied by connector boat 900 as described above with reference to FIG. 18.

Figure 5:
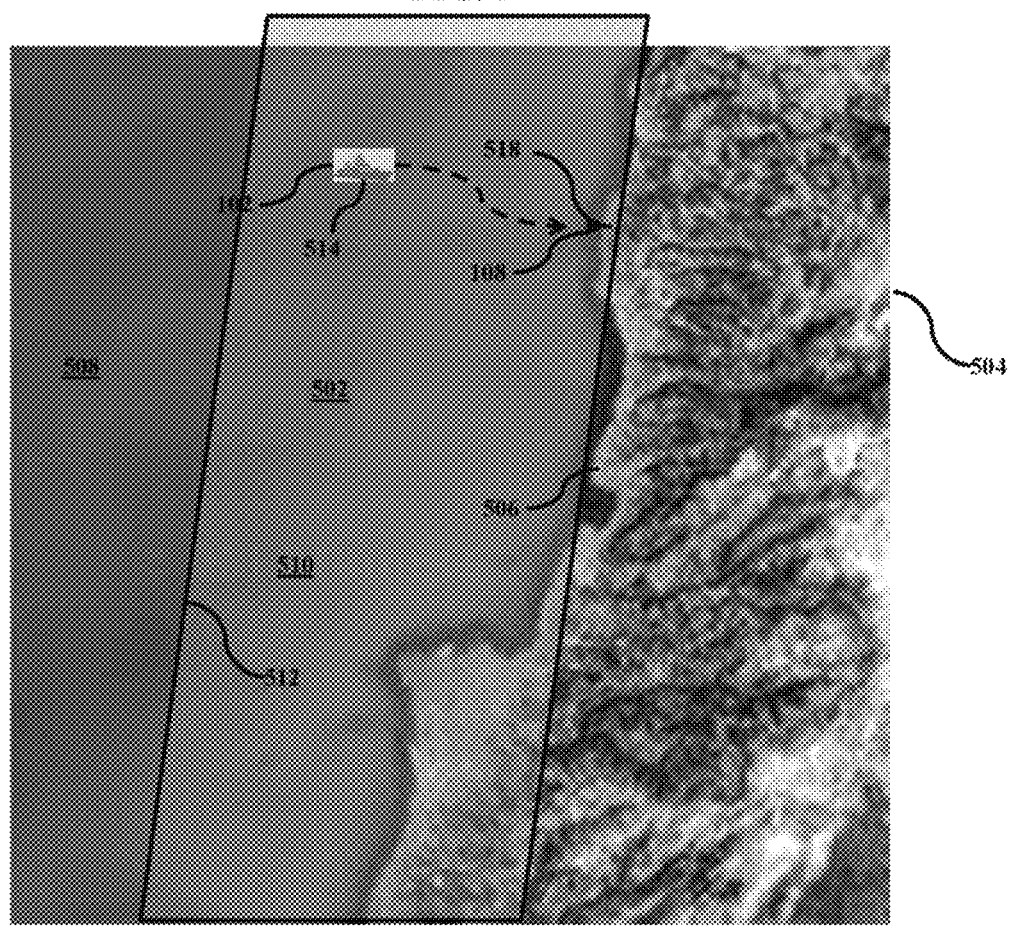
FIG. 5 illustrates an example conventional amphibious assault in a littoral battlespace.
Figure 6A:
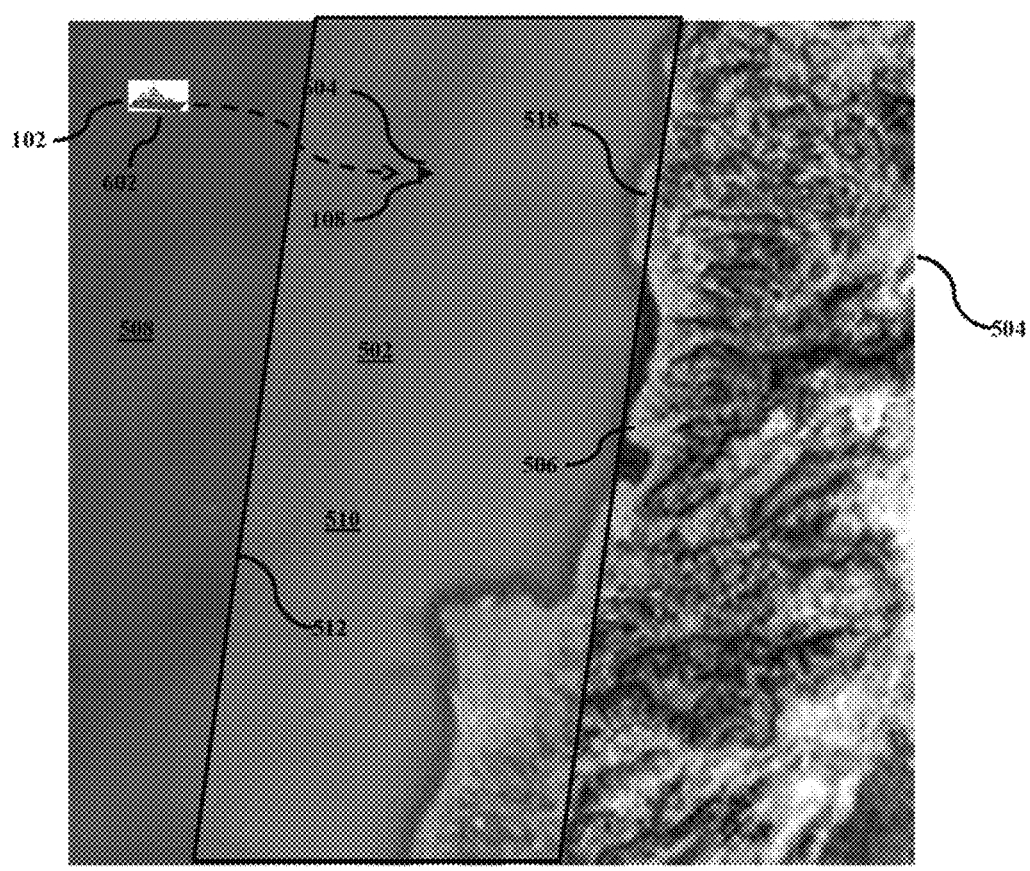
FIG. 6A illustrates another example conventional amphibious assault using an AAV in a littoral battlespace.
Figure 6B:
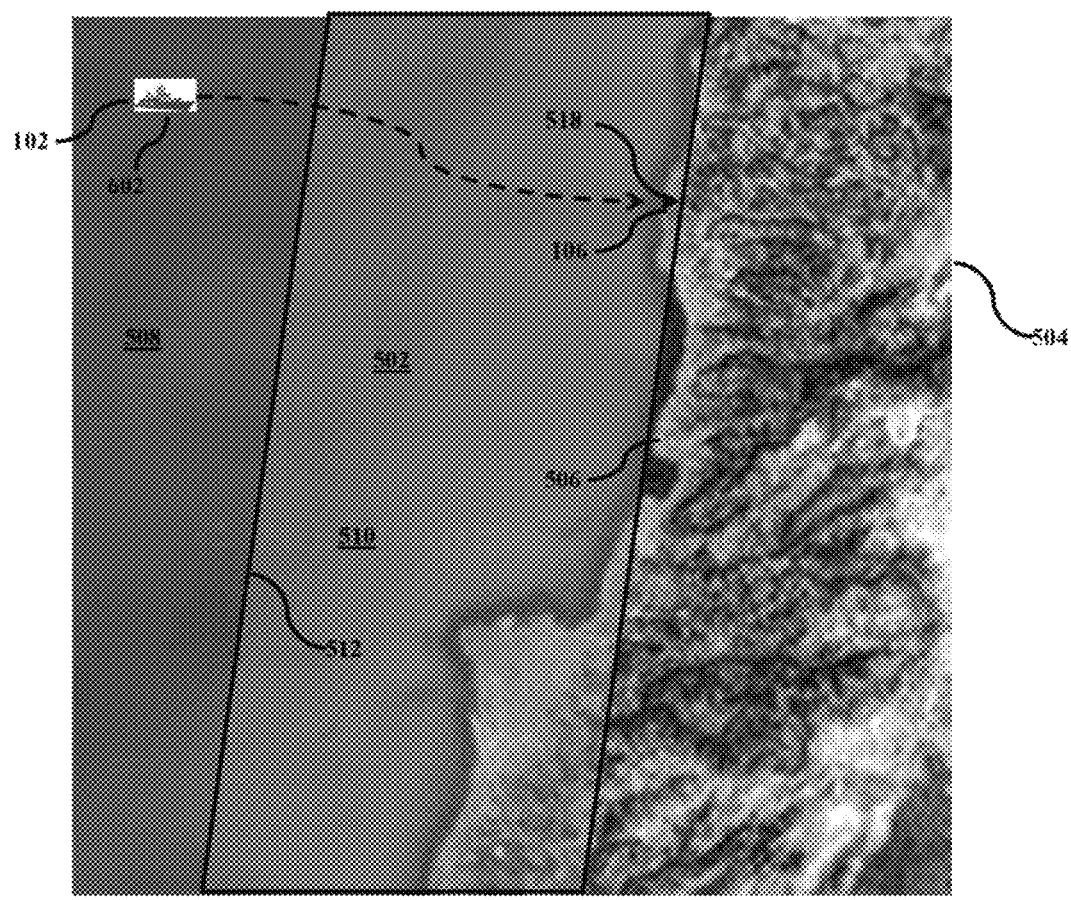
FIG. 6B illustrates another example conventional amphibious assault using a LCM6 in a littoral battlespace.

Returning to FIG. 33, connector boat 900 travels somewhat into in-range area 510 in a manner similar to warship 102 discussed above with reference to the conventions amphibious landing in FIG. 5. However, it should be pointed out that connector boat 900 is vastly smaller in size than warship 102 and is thus a much smaller target. Further, connector boat 900 is much more nimble in the sea as compared to warship 102. For these two reasons, connector boat 900 is less likely to be hit by land-based rockets as compared to warship 102. Finally, as a practical matter, even if connector boat 900 is catastrophically hit and sinks, connector boat 900 is a much less costly asset to lose as compared to warship 102.

In any event, when connector boat 900 reaches position 2500, connector boat 900 may deploy its cargo, which in this example includes AAV 108. As AAV 108 has a maximum speed of about 8 mph, AAV 108 may then travel the 8 miles to landing site in 1 hour.

In accordance with the present invention, the total time from deployment of connector boat 900 from FLO/FLO ship 1900 to landing of AAV 108 at landing site 518 is 5 hours. More importantly, FLO/FLO ship 1900 remains relatively safe in out-of-range area 508 the entire 5 hours. Furthermore, although the above discussed example described the deployment of connector boat 900 from FLO/FLO ship 1900, this is merely for purposes of explanation. As discussed above with reference to FIGS. 26-28, a plurality of loaded connector boats are simultaneously launched from the primary deployment site at position 620. Further, each connector boat may be loaded with a LCM6 or some combination of a plurality of AAVs and CRRCs. As such, sole FLO/FLO ship 1900 may launch, for example, an amphibious landing of: 32 AAVs with accompanying personnel; or 96 CRRCs with accompanying personnel; or 16 LCM6s with accompanying personnel; or some combination of these so as to land at landing site 518 much more quickly than is offered by the conventional method discussed above with reference to FIGS. 5-6B.

Returning to FIG. 7, after the amphibious vehicles transport to the landing site on the beach (S722), method 700 stops (S724).

The example system and method discussed above with reference to FIGS. 7-32 describe and initial amphibious landing. However, there may be situations where there is a need to quickly leave a first landing site and move to a new landing site. For example, there may be a change in plans after an initial landing. A connector boat may be used to quickly and efficiently facilitate such a second landing. Two example methods will now be described with reference to FIGS. 33-38.

A second non-limiting example amphibious landing in accordance with various embodiments of the present invention will now be described with reference to FIGS. 33-35.

Figure 41:
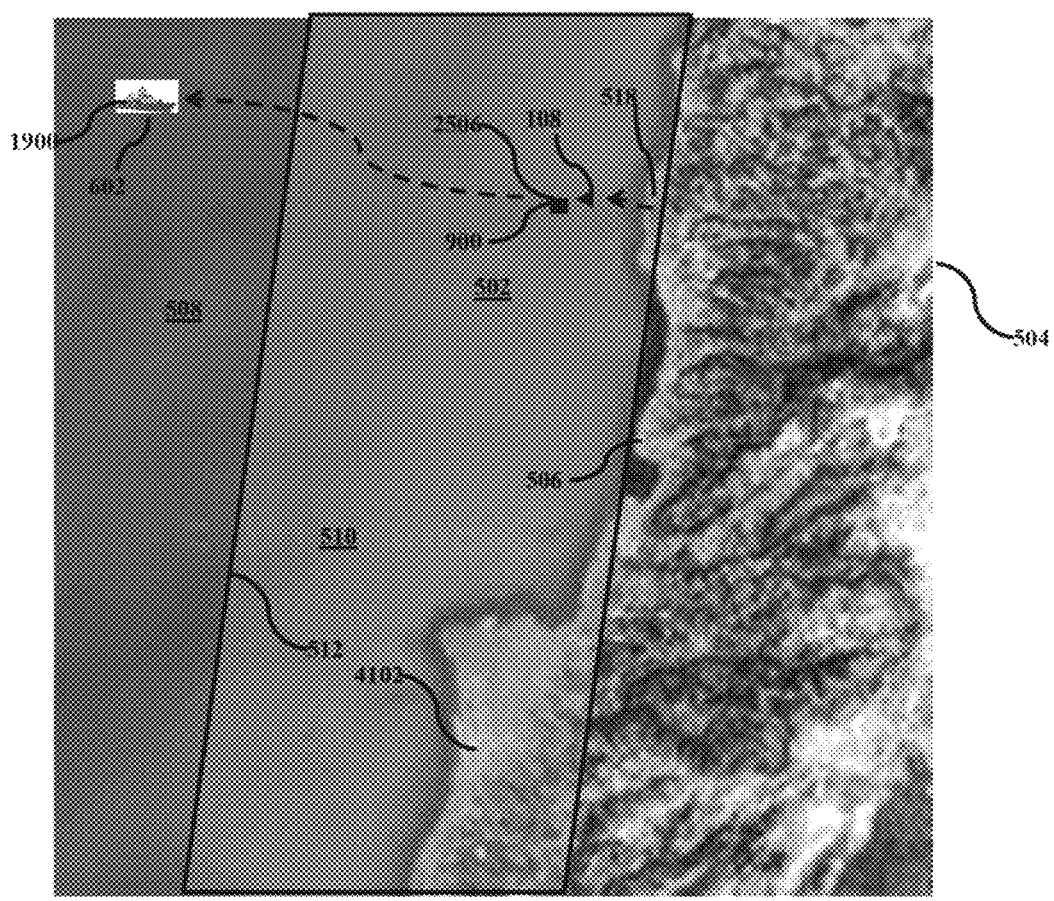
FIG. 41 illustrates an amphibious boarding in a littoral battlespace in accordance with various embodiments of the present invention.

FIG. 41 illustrates an amphibious boarding in a littoral battlespace in accordance with various embodiments of the present invention. FIG. 41 includes body of water 502, land 504, FLO/FLO ship 1900, connector boat 900 and AAV 108.

In this example, FLO/FLO ship 1900 is located at position 602 within out-of-range area 508. As such, FLO/FLO ship 1900 is OTH and has a decreased chance of taking damage from land-based rockets.

Further, for purposes of discussion, let a mission change of warship 102 specify that after an amphibious landing by AAV 108 at landing site 518 of coast 506, an amphibious landing is required by AAV 108 at a landing site 4102 of coast 506. In this example, AAV 108 leaves landing site 518 and returns to connector boat 900 at position 2506. Connector boat 900, now loaded with AAV 108, returns to FLO/FLO ship 1900 at position 602.

As mentioned above, AAV 108 has a maximum speed in water of about 8 mph. Accordingly, AAV 108 may travel the 8 miles from landing site 518 to connector boat 900 at position 2500 in an hour. Further, as mentioned above, connector boat 900 has a maximum fully loaded speed of 32 mph. For purposes of discussion, in this example, let position 2500 be 120 miles from FLO/FLO ship 1900 at position 620. Fully loaded connected boat 900 may then travel from position 2500 to FLO/FLO ship 1900 at position 602 in approximately 4 hours. At his point, connector boat 900 flow back onto FLO/FLO ship 1900.

In this manner, the total time to recall and reload AAV 108, via connector boat 900, from landing site 518 to FLO/FLO ship 1900 is 5 hours. More importantly, FLO/FLO ship 1900 remains relatively safe in out-of-range area 508 the entire 5 hours.

At this point, FLO/FLO ship may travel within out-of-range area 508 to a second primary deployment position. This will be described in greater detail with reference to FIG. 42.

Figure 42:
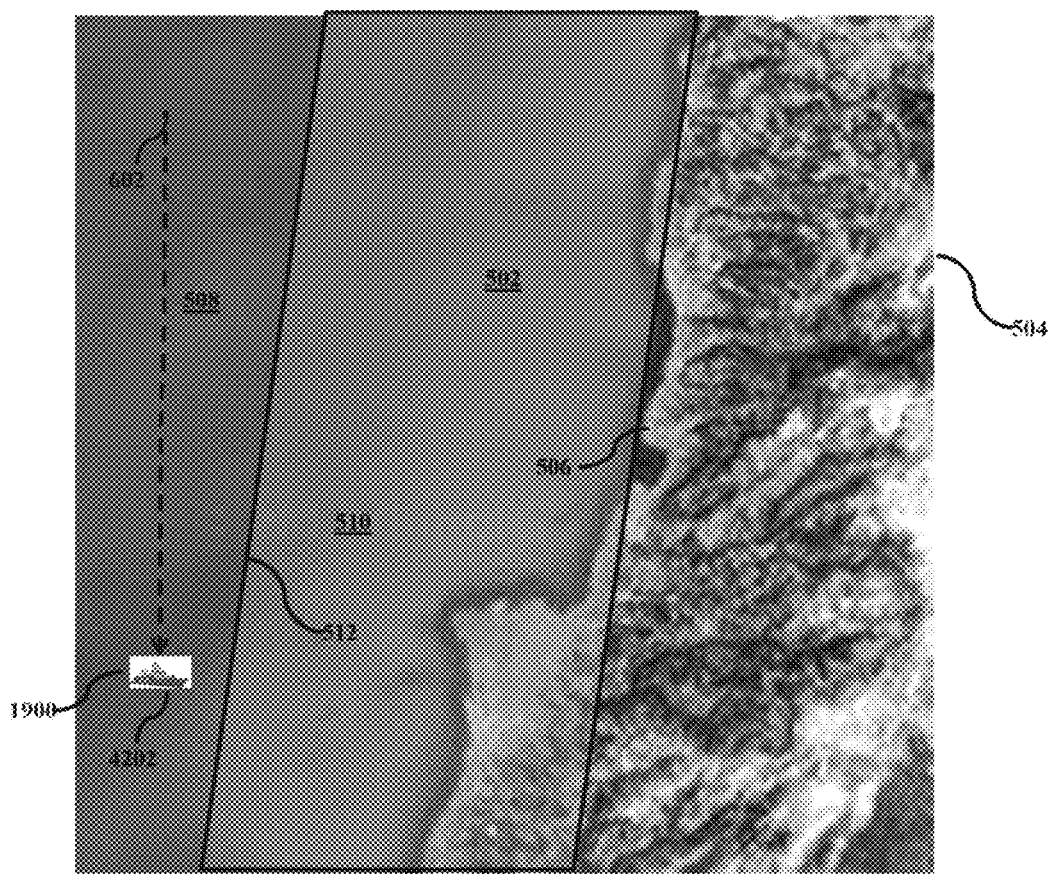
FIG. 42 illustrates a FLO/FLO ship sailing in a littoral battlespace to a second primary deployment location in accordance with various embodiments of the present invention.

FIG. 42 illustrates FLO/FLO ship 1900 sailing in a littoral battlespace to a second primary deployment location in accordance with various embodiments of the present invention. FIG. 42 includes body of water 502, land 504 and FLO/FLO ship 1900.

In this example, FLO/FLO ship 1900 sails from position 602, within out-of-range area 508, through out-of-range area 508 to position 4202, which is still within out-of-range area 508. As such, FLO/FLO ship 1900 is OTH and has a decreased chance of taking damage from land-based rockets.

Figure 43:
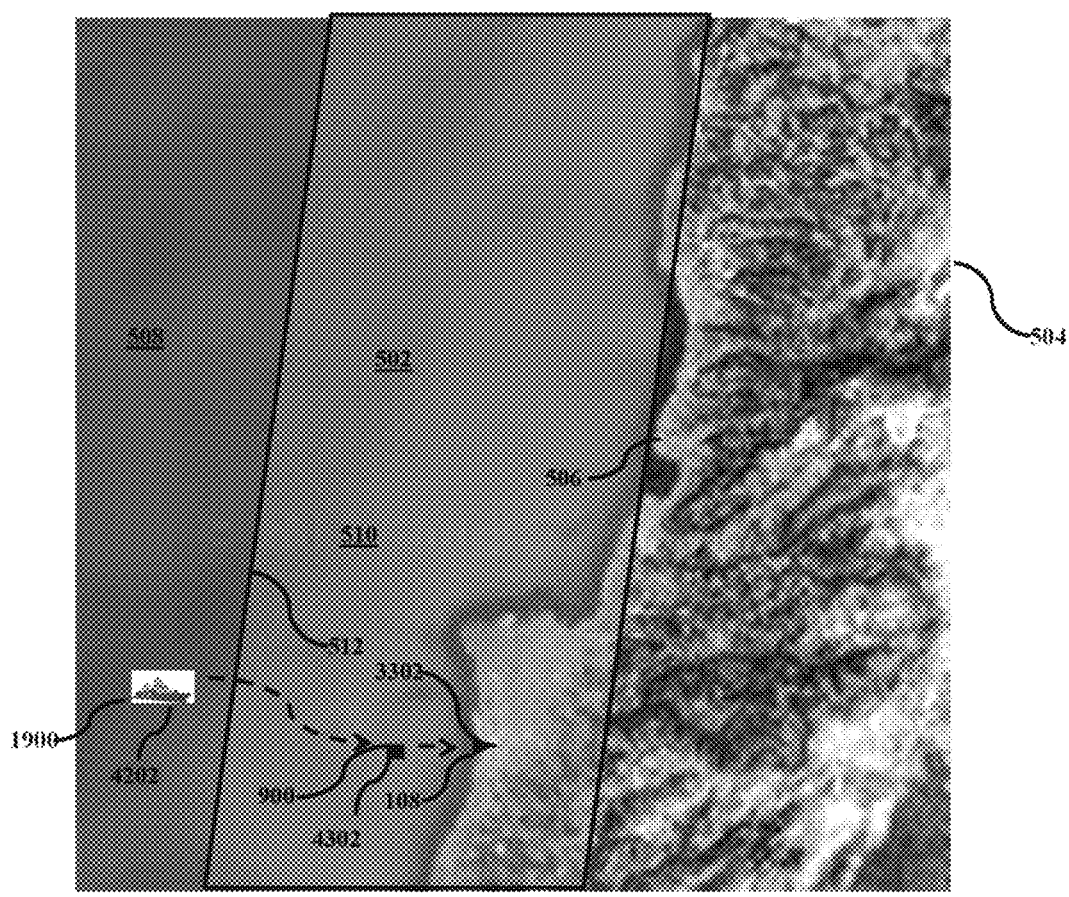
FIG. 43 illustrates a second amphibious assault in a littoral battlespace from the second primary deployment location in accordance with various embodiments of the present invention.

FIG. 43 illustrates a second amphibious assault in a littoral battlespace from the second primary deployment location in accordance with various embodiments of the present invention. FIG. 43 includes body of water 502, land 504, FLO/FLO ship 1900, connector boat 900 and AAV 108.

In this example, FLO/FLO ship 1900 is located at position 4202 within out-of-range area 508. As such, FLO/FLO ship 1900 is OTH and has a decreased chance of taking damage from land-based rockets. In accordance with various embodiments of the present invention, position 4202 is a second primary deployment location, as this is the second location where FLO/FLO ship 1900 deploys connector boat 900.

Further, for purposes of discussion, as mentioned above with reference to FIG. 41, let the mission of warship 102 now specify an amphibious landing by AAV 108 at landing site 4102 of coast 506. In this example, connector boat 900 deploys AAV 108 at position 4302. In accordance with various embodiments of the present invention, position 4302 is a second secondary deployment location, which is within in-range area 510.

As mentioned above, connector boat 900 has an operation range of 300-500 miles. Further, as mentioned above, connector boat 900 has a maximum fully loaded speed of 32 mph. For purposes of discussion, in this example, let position 2500 be 8 miles from landing site 518, and let position 2500 be 120 miles from position 620. Fully loaded connected boat 900 may then travel from FLO/FLO ship 1900 at position 602 to position 2500 in approximately 4 hours. At his point, connector boat 900 may deploy AAV 108 at position 2500. As AAV 108 has a maximum speed of about 8 mph, AAV 108 may then travel the 8 miles to landing site in 1 hour.

In this manner, the total time from deployment of connector boat 900 from FLO/FLO ship 1900 to landing of AAV 108 at landing site 518 is 5 hours. More importantly, FLO/FLO ship 1900 remains relatively safe in out-of-range area 508 the entire 5 hours.

A third non-limiting example amphibious landing in accordance with various embodiments of the present invention will now be described with reference to FIGS. 36-38.

Figure 44:
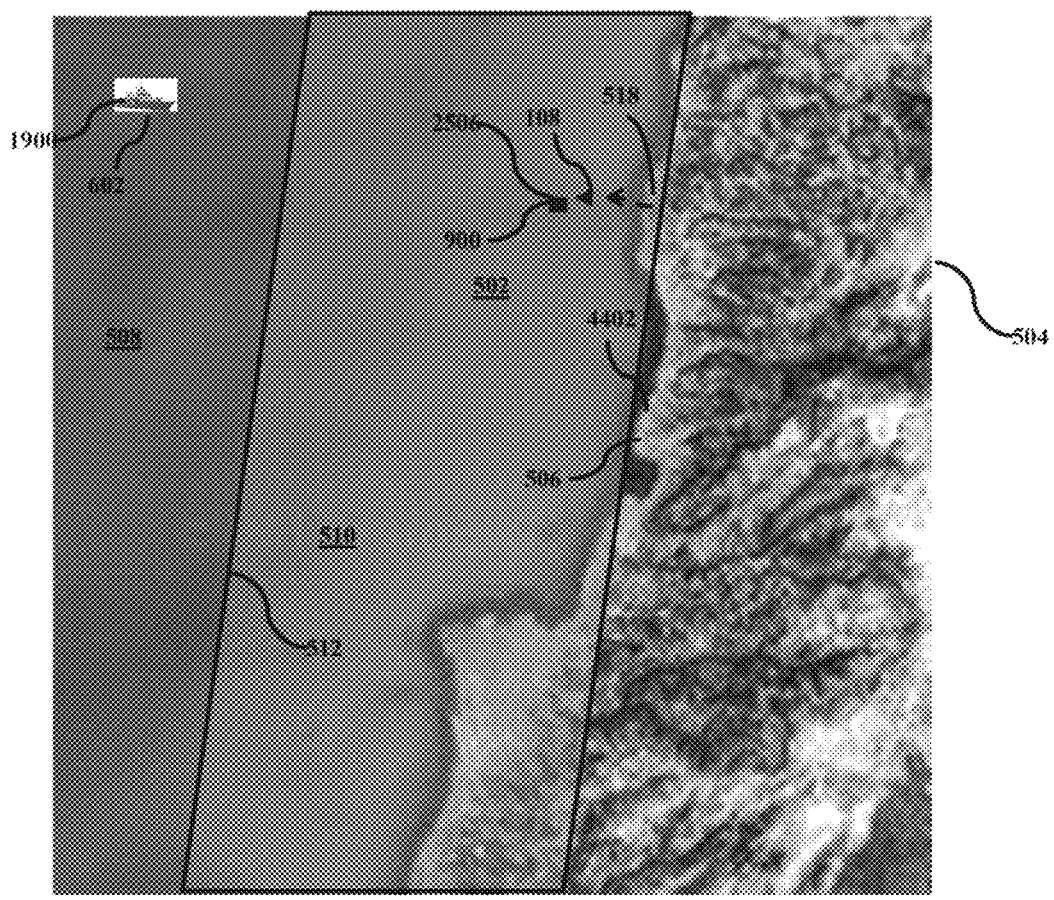
FIG. 44 illustrates another amphibious boarding in a littoral battlespace in accordance with various embodiments of the present invention.

FIG. 44 illustrates another amphibious boarding in a littoral battlespace in accordance with various embodiments of the present invention. FIG. 44 includes body of water 502, land 504, FLO/FLO ship 1900, connector boat 900 and AAV 108.

In this example, FLO/FLO ship 1900 is located at position 602 within out-of-range area 508. As such, FLO/FLO ship 1900 is OTH and has a decreased chance of taking damage from land-based rockets.

Further, for purposes of discussion, let a mission change of warship 102 specify that after an amphibious landing by AAV 108 at landing site 518 of coast 506, an amphibious landing is required by AAV 108 at a landing site 4402 of coast 506. In this example, AAV 108 leaves landing site 518 and returns to connector boat 900 at position 2506.

Figure 45:
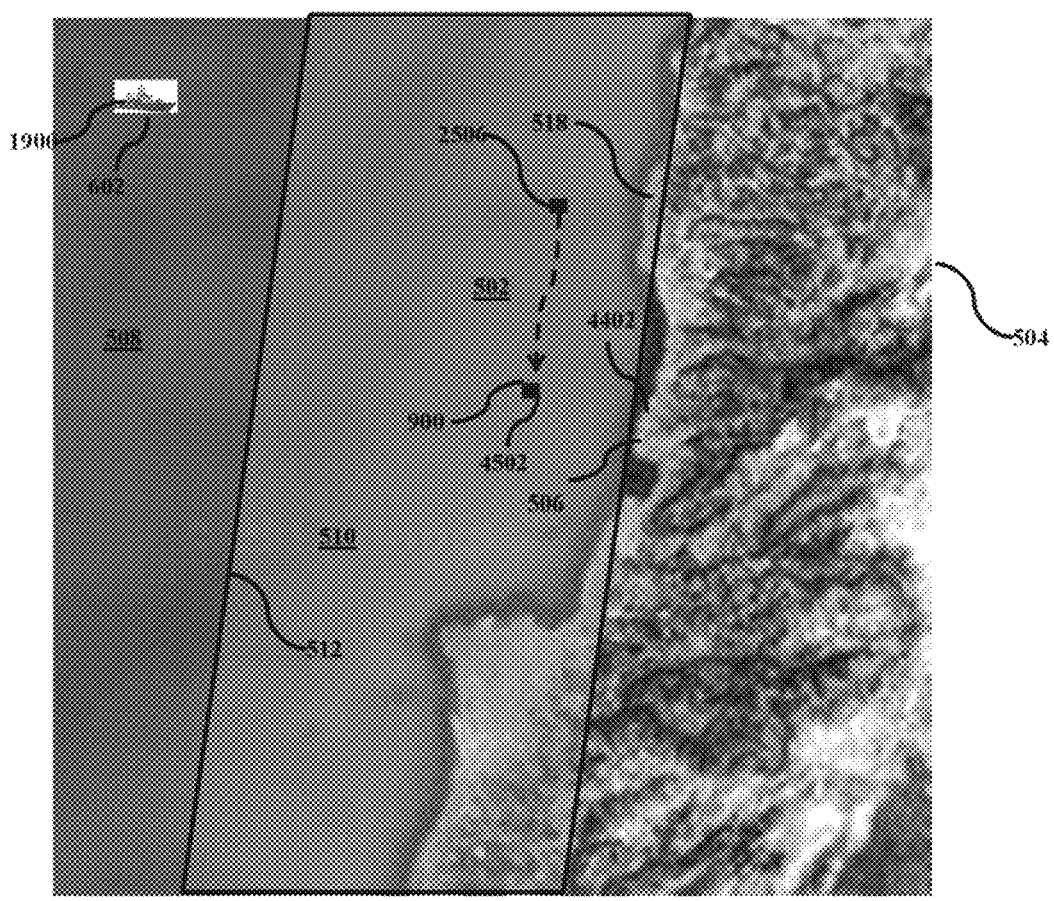
FIG. 45 illustrates a connector boat in a littoral battlespace sailing to a second secondary deployment location in accordance with various embodiments of the present invention.

FIG. 45 illustrates connector boat 900 sailing in a littoral battlespace to a second secondary deployment location in accordance with various embodiments of the present invention. FIG. 45 includes body of water 502, land 504, FLO/FLO ship 1900 and connector boat 900.

In this example, connector boat 900 sails from position 2506, within in-range area 510, through in-range area 510 to position 4502, which is still within in-range area 510.

Figure 46:
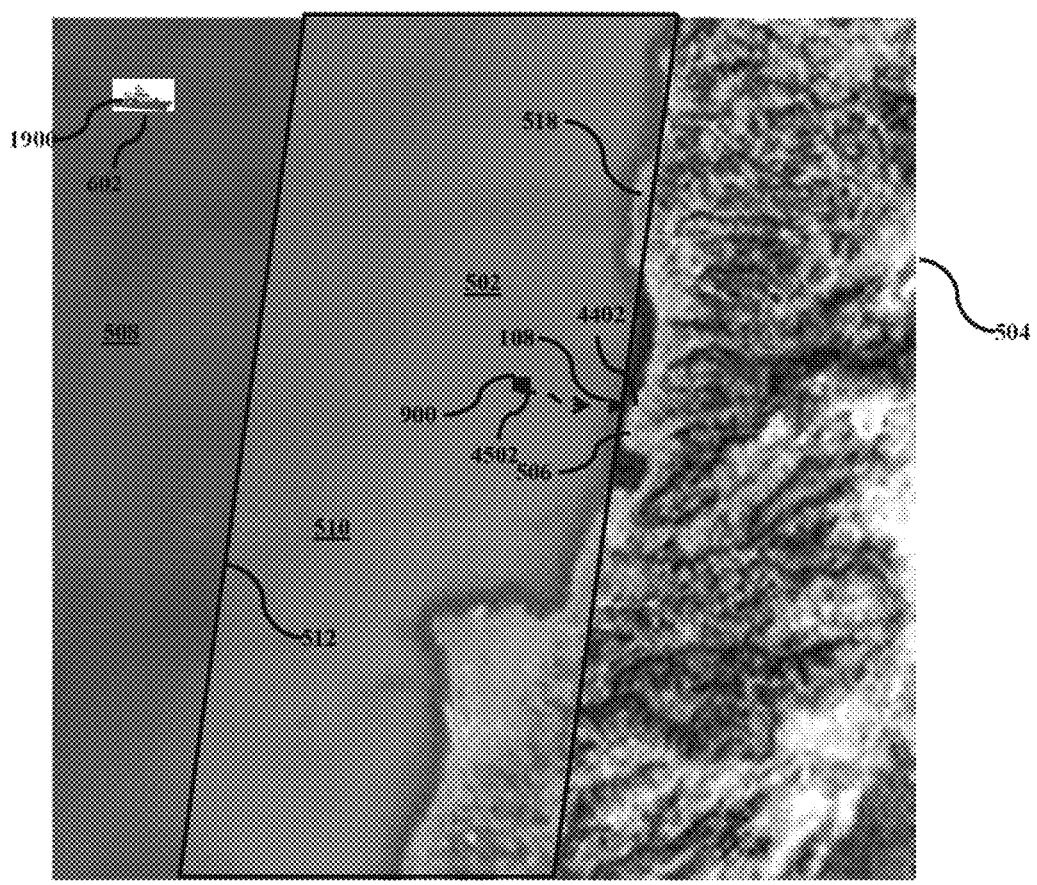
FIG. 46 illustrates a second amphibious assault in a littoral battlespace from the second secondary deployment location in accordance with various embodiments of the present invention.

FIG. 46 illustrates a second amphibious assault in a littoral battlespace from the second secondary deployment location in accordance with various embodiments of the present invention, FIG. 46 includes body of water 502, land 504, FLO/FLO ship 1900, connector boat 900 and AAV 108.

In this example, FLO/FLO ship 1900 is located at position 602 within out-of-range area 508. As such, FLO/FLO ship 1900 is OTH and has a decreased chance of taking damage from land-based rockets.

Further, for purposes of discussion, as mentioned above with reference to FIG. 44, let the mission of warship 102 now specify an amphibious landing by AAV 108 at landing site 4402 of coast 506. In this example, connector boat 900 deploys AAV 108 at position 4502. In accordance with various embodiments of the present invention, position 4502 is a second secondary deployment location, which is within in-range area 510. As AAV 108 has a maximum speed of about 8 mph, AAV 108 may then travel the 8 miles to landing site in 1 hour.

The example embodiments discussed above for a second amphibious landing in FIGS. 33-35 and FIGS. 36-38 are both viable options. The option discussed with respect to FIGS. 33-35 may be implemented when the distance between an initial landing site and a second landing site makes travel solely by connector boat impractical.

The non-limiting example embodiment amphibious landing systems and methods discussed above with reference to FIGS. 7-38 describe military amphibious assaults. It should be noted that various embodiments of the present invention are not limited to military applications. For example, a FLO/FLO ship and plurality of connector boats loaded with amphibious landing vehicles or other payload may be used for humanitarian responses.

For example, consider the situation wherein a Caribbean island nation is devastated by a hurricane, to the extent that airport runways and sea ports are both damaged and replete with wrecked structures and clutter. In such a situation, the ability of an outside nation to provide humanitarian relief will be greatly hampered until the airport runways and/or sea ports are improved, which may take valuable days or weeks.

However, by using an amphibious deployment method in accordance with various embodiments of the present invention, a single FLO/FLO ship may quickly and efficiently deploy 16 connector boats, each loaded with an LCM6 vehicle, each of which is loaded with humanitarian volunteers and supplies. Further, once the LCM6's have all landed on a beach landing site, and have been quickly unloaded, they may each efficiently return to a respective connector boat. All the connector boats may then quickly return to a sea base to restock a respective LCM6, only to repeat the efficient amphibious beach landing.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A method comprising:
    loading an amphibious vehicle onto a connector boat;
    loading the loaded connector boat onto a semi-submersible ship;
    transporting the semi-submersible ship having the loaded connector boat stored thereon to a location;
    taking water ballast onto the semi-submersible ship at the location;
    floating the loaded connector boat off of the semi-submersible ship;
    transporting the loaded connector boat to a second location;
    unloading the vehicle into water at the second location;
    transporting the vehicle to a third location;
    connecting a detachable power conduit from the connector boat to the amphibious vehicle;
    generating electrical power via the connector boat; and
    providing, via the power conduit the electrical power generated by the connector boat to the amphibious vehicle.

2. A method comprising:
    loading a landing craft onto a connector boat;
    loading the loaded connector boat onto a semi-submersible ship;
    transporting the semi-submersible ship having the loaded connector boat stored thereon to a location;
    taking water ballast onto the semi-submersible ship at the location;
    floating the loaded connector boat off of the semi-submersible ship;
    transporting the loaded connector boat to a second location;
    unloading the landing craft into water at the second location; and
    transporting the landing craft to a third location.

3. The method of claim 2, wherein said loading the loaded connector boat onto the semi-submersible ship comprises:
    taking water ballast onto the semi-submersible ship;
    floating the loaded connector boat onto the semi-submersible ship; and
    jettisoning the water ballast from the semi-submersible ship.

4. The method of claim 2, further comprising:
    loading a second landing craft onto a second connector boat;
    floating the second loaded connector boat onto the semi-submersible ship;
    transporting the semi-submersible ship having the loaded connector boat stored thereon to a location;
    taking water ballast onto the semi-submersible ship at the location;
    floating the second loaded connector boat off of the semi-submersible ship;
    transporting the second loaded connector boat to the second location;
    unloading the second landing craft into the water;
    transporting the second landing craft to the third location.

5. The method of claim 2, further comprising loading a vehicle onto the landing craft prior to said loading the landing craft onto the connector boat.

* * * * *